United States Patent [19]

Nakamura et al.

[11] Patent Number: 5,270,766
[45] Date of Patent: Dec. 14, 1993

[54] OPERATION CONTROL APPARATUS OF ELECTRIC ZOOM CAMERA

[75] Inventors: Toshiyuki Nakamura; Kazuyuki Kazami, both of Tokyo; Koichi Daitoku, Sagamihara; Hidenori Miyamoto, Kawasaki, all of Japan

[73] Assignee: Nikon Corporation, Tokyo, Japan

[21] Appl. No.: 29,292

[22] Filed: Mar. 8, 1993

Related U.S. Application Data

[60] Continuation of Ser. No. 823,116, Jan. 21, 1992, abandoned, which is a division of Ser. No. 449,355, Dec. 13, 1989, Pat. No. 5,111,226, which is a continuation of Ser. No. 307,741, Feb. 8, 1989, abandoned.

[30] Foreign Application Priority Data

| Feb. 12, 1988 | [JP] | Japan | 63-17246[U] |
| Feb. 12, 1988 | [JP] | Japan | 63-30505 |
| Apr. 25, 1988 | [JP] | Japan | 63-103635 |
| Apr. 26, 1988 | [JP] | Japan | 63-102984 |
| Jul. 27, 1988 | [JP] | Japan | 63-187747 |

[51] Int. Cl.$^5$ .............................. G03B 7/00
[52] U.S. Cl. ............................ 354/410; 354/195.1; 354/105
[58] Field of Search .................. 354/410, 195.1, 105, 354/106

[56] References Cited

U.S. PATENT DOCUMENTS

| 4,652,104 | 3/1987 | Harvey | 354/106 |
| 4,678,299 | 7/1987 | Harvey | 354/21 |
| 4,896,177 | 1/1990 | Kazami et al. | 354/195.1 |
| 5,060,006 | 10/1991 | Taniguchi et al. | 354/106 |
| 5,097,285 | 3/1992 | Wakabayashi et al. | 354/471 |

*Primary Examiner*—Russell E. Adams
*Attorney, Agent, or Firm*—Shapiro and Shapiro

[57] ABSTRACT

An electric zoom camera comprises a photographing lens system having a zoom lens system, detecting device for detecting a focal length of the photographing lens system and generating a corresponding output, device for driving the photographing lens system for zooming, a commanding means for generating a command for executing zooming to the driving to device, and a control device for controlling the driving device, in accordance with the output from the detecting device and the command, to change a focal length of the photographing lens stepwise between focal lengths of a plurality of predetermined focal lengths arranged substantially in accordance with a geometric progression.

5 Claims, 18 Drawing Sheets

INITIAL POSITION SETTING

INITIAL POSITION SETTING

INITIAL POSITION SETTING

OPERATION CONTROL APPARATUS OF ELECTRIC ZOOM CAMERA

This is a continuation of application Ser. No. 823,116 filed Jan. 21, 1992, now abandoned; which is a division of application Ser. No. 449,355 filed Dec. 13, 1989 (now U.S. Pat. No. 5,111,226 issued May 5, 1992); which is a continuation of application Ser. No. 307,741 filed Feb. 8, 1989, now abandoned.

BACKGROUND OF THE INVENTION

1. Field of the Invention

The present invention relates to an electric zoom camera and, more particularly, to a zooming operation control system.

2. Related Background Art

A t/w switchable camera capable of performing switching between telephoto and wide-angle modes by operating a photographing lens is known. In this t/w switchable camera, a photographing lens can be instantaneously set to a desired focal length by an operation unit located at an upper portion of a camera body. Therefore, a degree of freedom of photography is higher than that of a conventional fixed-focus compact camera. The t/w switchable camera, however, cannot perform photography by an intermediate focal length between the telephoto and wide-angle ranges. For this reason, a zoom compact camera mounting a zoom lens and capable of continuously changing a focal length from the telephoto to wide-angle ranges has become commercially available.

A known zoom compact camera normally has an operation unit for designating switching of a focal length between telephoto and wide-angle directions. While the operation unit is operated, a zoom lens is electrically driven in a zooming direction designated by the operation unit. When an operator removes his or her hand from the operation unit, driving of the lens is stopped. In this manner, a focal length can be arbitrarily set throughout the entire focal length range of the mounted zoom lens. The operation unit, however, must be continuously operated until a desired image magnification is obtained, resulting in a poor operability.

This problem can be solved by moving a photographing lens along a designated zooming direction in accordance with a zooming command and automatically stopping the lens at a predetermined intermediate focal length position. Such a zooming control system will be called "step zoom control" hereinafter.

The present applicant has proposed a t/w switchable camera capable of performing two-shot continuous photography by different focal lengths using a self-timer (U.S. Pat. No. 199,142 corresponding to Japanese Utility Model Application No. 62-86562 and the like). By combining the technique of this proposed camera with the above step zoom control, a camera capable of executing the step zoom control in response to one photography operation and executing exposure a film each time zooming to each focal length is completed can be obtained (this shooting system will be called "sequence zoom shooting" hereinafter).

SUMMARY OF THE INVENTION

It is an object of the present invention to provide a camera having improved step zoom control.

In order to perform the step zoom control, if one or more intermediate focal lengths are set within a focal length range controllable by a photographing lens by arithmetic progression, degrees of changes in magnification of a series of pictures photographed in accordance with the set focal lengths visually differ in telephoto and wide-angle modes, resulting in unnatural story photography. In the present invention, therefore, focal lengths are arranged by geometric progression so that change rates of the focal lengths at the respective steps in the step zoom control become substantially equal to each other.

It is another object of the present invention to provide a camera having a more practical sequence zoom shooting system.

It is convenient to arbitrarily cancel exposure during photography executed by the sequence zoom shooting before exposure of all of preset shots is completed. For example, assuming that 5-shot sequence zoom shooting is set to start photography but an object to be photographed disappears when the second shot is finished, if subsequent exposure cannot be cancelled, unnecessary pictures are taken.

It is, therefore, still another object of the present invention to provide an operation control apparatus of a camera for allowing an operator to arbitrarily cancel the sequence zoom shooting.

It is still another object of the present invention to provide an operation control apparatus of a camera for allowing an operator to arbitrarily select a focal length and a zooming direction of a photographing lens at the start of the sequence zoom shooting.

DETAILED DESCRIPTION OF THE PREFERRED EMBODIMENTS

Figure 1:
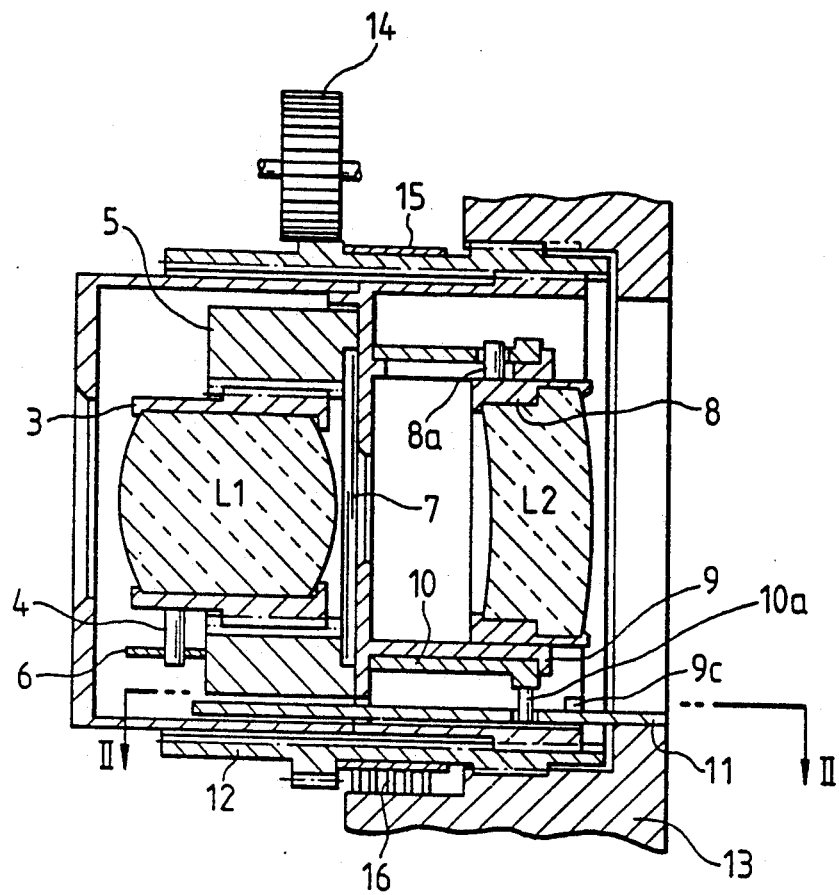
FIG. 1 is a sectional view showing a mechanism of a camera according to an embodiment of the present invention.

FIG. 1 shows a zooming mechanism of a photographing lens in an electric zoom camera, in which a zoom lens comprises a front-group lens L1 and a rear-group lens L2. A holding cylinder 3 holds the front-group lens. A helicoid thread is formed on the outer surface of the holding cylinder 3, and a focusing pin 4 extends therefrom. A focusing lever 6 having a helicoid to be meshed with a helicoid formed on the inner surface of a cylindrical case 5 incorporating a driving unit for a shutter and for focusing is rotated about an optical axis by the driving unit in the case 5 to move the front-group lens L1 via the pin 4 engaged with the focusing lever 6, thereby performing focusing. These elements constitute a focusing mechanism. Shutter blades 7 are also included in the mechanism.

A holding cylinder 8 holds the rear-group-lens. When a pin 8a is guided in a straight groove of a guide cylinder 9, the holding cylinder 8 can move straight along the optical axis direction. A cam groove to be engaged with the pin 8a is formed on the outer surface of a cam ring 10 rotatably fitted on the outer surface of an inner cylinder of the guide cylinder 9.

Figure 2:
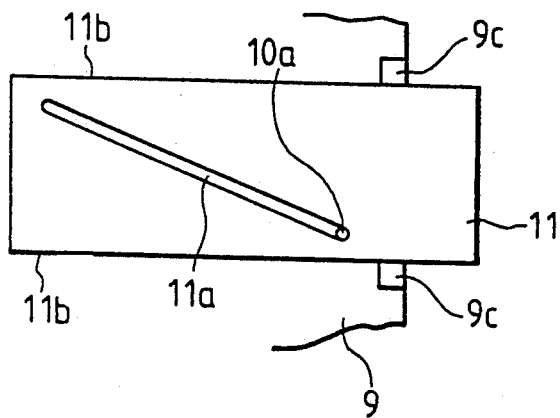
FIG. 2 is a view taken along a line II—II in FIG. 1.

A pin 10a extending from the cam ring 10 is inserted in and engaged with a cam groove 11a of a guide plate 11 fixed to a fixing portion 13 of a camera, as shown in FIG. 2. Engagement between a side surface 11b of the guide plate 11 and a projecting portion 9c formed on an outer cylinder of the guide cylinder 9 prevents rotation of the guide cylinder 9.

A rotary cylinder 12 threadably engages with the inner surface of the fixing portion 13 by a helicoid and also engages with the outer surface of the outer cylinder of the guide cylinder 9 by a helicoid. The rotary cylinder 12 is rotated about the optical axis by a transmission gear 14 for transmitting a driving force from an electric driving unit (not shown). An encoder substrate 15 for position detection is fixed on the outer surface of the rotary cylinder 12. When a focal length is to be changed, an encoder brush 16 slides on an electrically conductive pattern of the substrate 15.

Therefore, in response to rotation of the rotary cylinder 12, the guide cylinder 9 moves straight along the optical axis direction to move the lens L1 and at the same time moves the lens L2 via the cam ring 10, thereby performing zooming.

Figure 3:
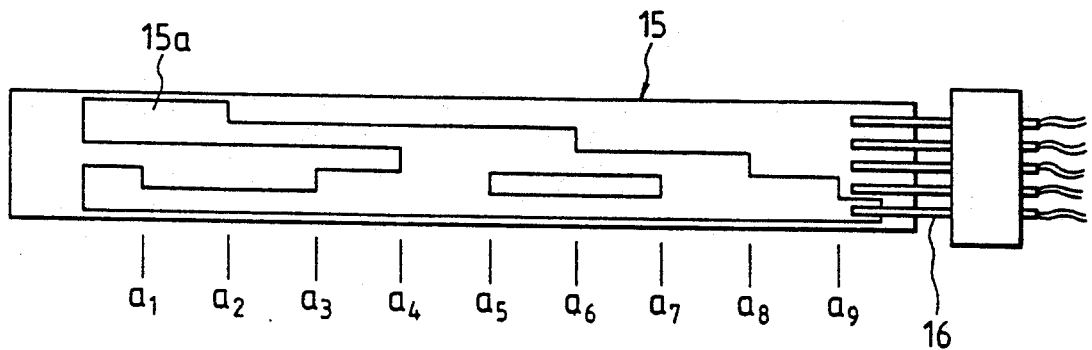
FIG. 3 is a developed view showing a printed circuit board.

FIG. 3 shows the encoder substrate 15 in a developed form. Referring to FIG. 3, switching portions of an electrically conductive pattern 15a, i.e., pattern switching positions $a_1, a_2, \ldots, a_9$ represent positions at which a position signal from the brush 16 changes. Assuming that photographing lens focal lengths corresponding to the above switching positions are $f_1, f_2, \ldots, f_9$, respectively, the switching positions $a_1$ to $a_9$ are determined such that ratios between pairs of two neighboring focal lengths become substantially constant as follows:

$$f_2/f_1 \approx f_3/f_2 \approx \ldots \approx f_9/f_8$$

Since an image magnification is inverse proportion to a focal length, a change in image magnification is constant at any two adjacent positions of the switching positions $a_1$ to $a_9$.

When a distance between the minimum and maximum focal lengths is to be divided into nine sections in a 35-mm-70-mm zoom lens, focal lengths are determined with respect to the switching positions $a_1$ to $a_9$ as shown in Table 1 below.

TABLE 1

|  |  |  |
|---|---|---|
| $a_1$ | $f_1 = 35$ | mm |
| $a_2$ | $f_2 = 38.17$ | |
| $a_3$ | $f_3 = 41.62$ | |
| $a_4$ | $f_4 = 45.39$ | |
| $a_5$ | $f_5 = 49.5$ | |
| $a_6$ | $f_6 = 53.98$ | |
| $a_7$ | $f_7 = 58.86$ | |
| $a_8$ | $f_8 = 64.19$ | |
| $a_9$ | $f_9 = 70$ | |

Figure 5:
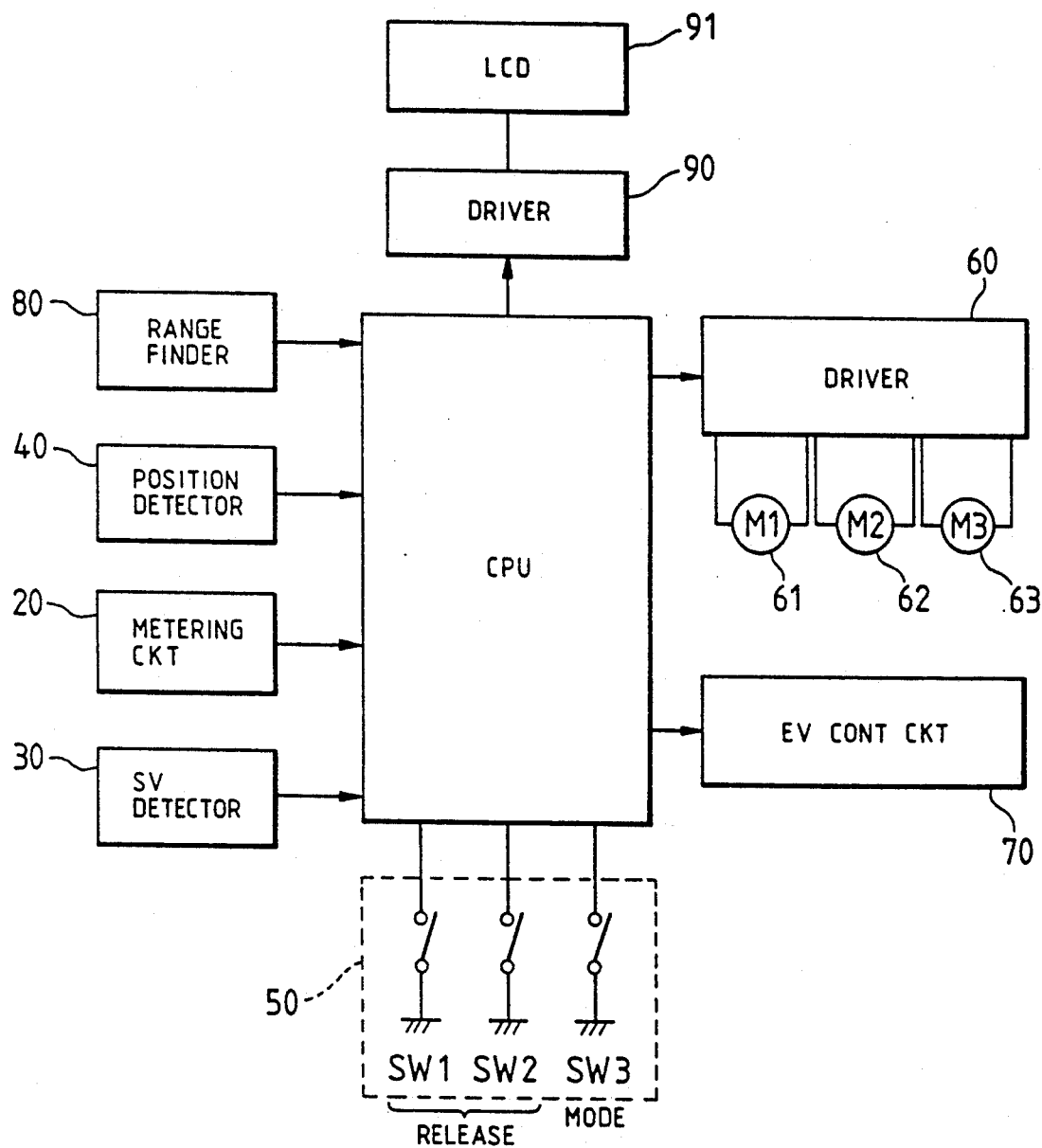
FIG. 5 is a block diagram showing an arrangement of a control apparatus of a camera.

FIG. 5 shows an overall arrangement of a control apparatus.

A central processing unit (CPU) receives a brightness value of an object to be photographed from a metering circuit 20, a speed value from an SV detector 30, and the above encoder position signal from a position detector 40. From a command unit 50, the CPU receives a zoom-up command or zoom-down command for manual electric zooming, a zoom command for automatic electric zooming, the number of focal lengths which a lens can take in the zooming operation, i.e., the number of steps of zooming up or zooming down, and a sequence zoom shooting command for executing photography by the sequence zoom shooting. The CPU drives a zooming motor 62 via a driver 60 on the basis of a zooming signal from the command unit 50. An exposure value is calculated by a full-aperture F-number of a photographing lens read out in accordance with the brightness value, the speed value, and the position signal from the encoder, and a shutter and an aperture are controlled by an EV control circuit 70.

The full-aperture F-number is determined as follows. In the automatic electric zooming or sequence zoom shooting, the photographic lens is stopped when a zooming position designated by the camera is detected by the position signal from the encoder. Therefore, a full-aperture F-number of a focal length corresponding to the position signal can be used.

Therefore, a correspondence table between position signals and full-aperture F-numbers may be provided in the CPU to obtain a full-aperture F-number by a position signal. In the manual electric zooming, a focal length of the photographing lens is controlled not by a position signal from the encoder but by an output or disappearance of a signal of zoom-up or zoom-down command by an operator. Therefore, the photographing lens may be moved into an arbitrary position between two switching positions.

For this reason, an exposure value is calculated on the basis of not a full-aperture F-number corresponding to a position signal from the encoder but a full-aperture F-number corresponding to an intermediate focal length between two adjacent position signals. For this purpose, a correspondence table between position signals and full-aperture F-numbers corresponding to intermediate focal lengths between the position signals is provided in the CPU, thereby calculating a full-aperture F-number as described above In this manner, the above two tables are selectively used in the automatic or manual electric zooming.

An operation of the camera having the above arrangement will be described below assuming that the command unit 50 commands the sequence zoom shooting. When the sequence zoom shooting is commanded and a release button is operated, the front- and rear-group lenses L1 and L2 are moved at different speeds in the optical axis direction by the zooming motor 62. When the switching position $a_1$ of 35 mm is detected by a position signal from the encoder, the motor 62 is stopped, and a focal length of the photographing lens is set at 35 mm.

Thereafter, the front-group lens L1 is driven for automatic focusing. A full-aperture F-number is obtained by the position signal representing that the focal length is 35 mm, a time value and an aperture value are calculated in accordance with a brightness value and a speed value, and the EV control circuit 70 controls the aperture and the shutter to perform photography.

A film is then wound up, and the photographing lens is set to a focal length of, e.g., 49.5 mm, thereby similarly performing photography. Subsequently, the photographing lens is set to a focal length of, e.g., 70 mm to perform photography.

Three continuous pictures taken by the above sequence zoom shooting have an equal change degree of image magnification and therefore are visually natural.

Figure 4:
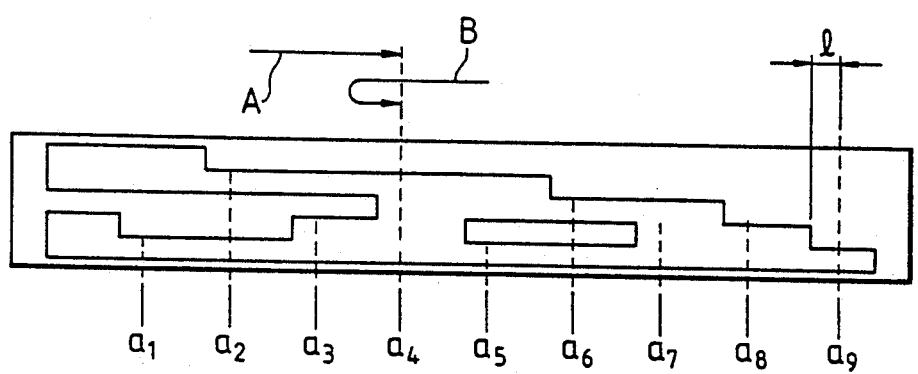
FIG. 4 is a developed view showing a modification of the printed circuit board.

Referring to FIG. 4, each of the switching positions $a_1$ to $a_9$ is offset with respect to the encoder pattern shown in FIG. 3 by a predetermined amount 1, thereby achieving the following effect.

When driving of the motor 62 is to be stopped, in performing zooming in the direction from the wide-range to telephoto-range, the brush 16 moves and stops on the encoder pattern is indicated by an arrow A, and in performing zooming in the direction from the telephoto-range to wide-range, the brush 16 moves to a position beyond a stop position and then U-turns and stops as indicated by an arrow B. In this manner, since moving directions immediately before stopping coincide with each other, degradation in precision in setting of a focal length due to backlash or the like of a photographing lens driving system can be prevented. In this case, since the photographing lens always moves in one way before stopping, a moving amount of the photographing lens caused by inertia after motor stop is commanded is estimated beforehand, and a switching position is offset by this amount, i.e., 1. In this manner, an error produced by inertia can be prevented to perform control with higher precision.

In the above description, the pattern is set such that ratios between the sequential position signals obtained from the encoder become substantially constant, thereby performing zooming of the photographing lens stepwise. The encoder, however, may output position signals continuously representing photographing lens positions to perform zooming stepwise by the processing of the CPU. In this case, stepwise zooming and conventional continuous zooming may be selectively performed if necessary.

An embodiment of the sequence zoom shooting using the camera shown in FIG. 5 will be described below.

The driver 60 shown in FIG. 5 is also connected to a focusing motor 61 and a film wind-up motor 63. A range finder 80 is connected to the CPU and outputs range information concerning a distance to an object to be photographed. On the basis of the range information, the CPU determines a lens moving amount for focusing and controls the motor 61 via the driver 60 to perform focusing.

The command unit 50 is connected to switches SW1 and SW2 interlocked with an operation of a release button (shutter operating member (not shown)). Upon depression to a first stroke of the release button, the switch SW1 is turned on, and upon depression to a second stroke thereof, the switch SW2 is turned on. When the switch SW1 is turned on, the CPU activates the range finder 80 and the metering circuit 20. In addition, in response to a release signal output when the switch SW2 is turned on, the CPU activates the driver 60 and the EV control circuit 70.

The CPU is also connected to a driver 90 of a liquid crystal display (LCD) 91, and the command unit 50 is also connected to a mode set switch SW3. The switch SW3 is turned on in association with an operation of a mode set button (not shown). When the switch SW3 is turned on, the CPU sets a sequence zoom shooting mode and displays this information on the LCD 91.

When the sequence zoom shooting mode is set, the CPU sequentially changes a focal length of the photographing lens to predetermined positions by the zooming motor 62 via the driver 60, thereby continuously performing photography of a predetermined number of shots. When the switch SW2 is turned off during the sequence zoom shooting, a sequence zoom shooting release signal is output.

In this embodiment, when the sequence zoom shooting mode is set, the focal length of the photographing lens is sequentially changed to 35 mm, 50 mm and 80 mm in response to an output of the release signal, thereby performing photography at each position. That is, three shots are continuously photographed.

A control procedure performed by the CPU will be described below with reference to a flow chart shown in FIG. 6.

In step S1, the CPU checks whether the switch SW1 is turned on. If YES in step S1, the flow advances to step S2 to set a count value K to be 0. In step S3, the CPU reads out information from the metering circuit 20 and the range finder 80. In step S4, the CPU checks whether the sequence zoom shooting mode is set, i.e., whether the switch SW3 is turned on.

In step S5, the CPU increments the count value K by one, and in step S6, the CPU checks a value of the count value K. The CPU sets a focal length f of the photographing lens to be 35 mm, 50 mm or 80 mm in step S7, S8 or S9 if K=1, K=2 or K=3, respectively. In step S10, the CPU drives the photographing lens to the set focal position by the motor 62 via the driver 60. That is, the CPU performs zooming.

If NO in step S4, the CPU checks in step S11 whether the switch SW2 is turned on. In step S12, the CPU performs focusing on the basis of the readout information and drives the EV control circuit 70 on the basis of brightness information, speed value information, lens brightness information (F-number information) corresponding to the set focal length, thereby exposing a film. Thereafter, in step S13, the CPU drives the motor 63 to wind up the film by one shot, and the flow advances to step S14.

In step S14, the CPU checks in accordance with a state of the switch SW3 whether the sequence zoom shooting mode is set. If YES in step S14, the CPU checks in step S15 whether the count value k is 3.

Figure 7:
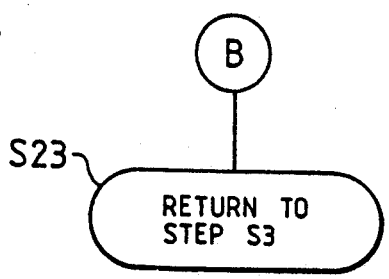

If NO in step S15, the flow returns to step S3 in accordance with step S23 in FIG. 7, and the processing from step S3 is repeated. In step S16, the sequence zoom shooting mode is cancelled. If the CPU determines in step S17 that the switch SW1 is turned off, the processing is ended.

Figure 8:
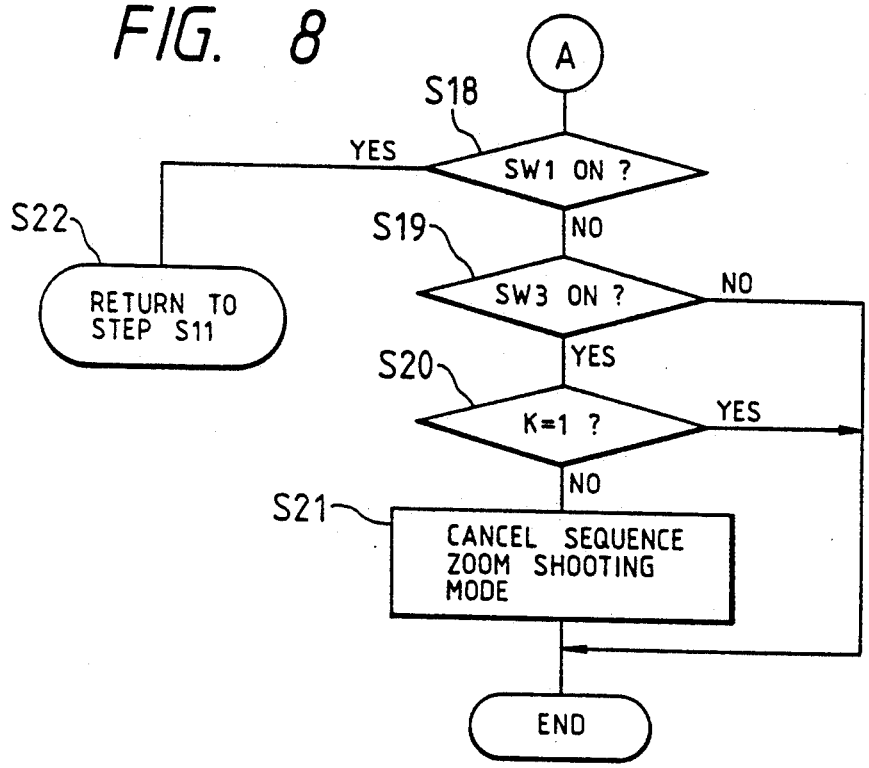

Meanwhile, if NO in step S11, i.e., if the switch SW2 is turned off after zooming in step S10, the flow advances to step S18 in FIG. 8, and the CPU checks whether the switch SW1 is turned on. If YES in step S18, the flow returns to step S11 in FIG. 6 in accordance with step S22. If NO in step S18, the flow advances to step S19. In step S19, the CPU checks whether the sequence zoom shooting mode is set. If NO in step S19, the CPU ends the processing. If YES in step S19, the CPU checks in step S20 whether the count value K is 1. If YES in step S20, the CPU ends the processing. If NO in step S20, the CPU cancels the sequence zoom shooting mode in step S21 and then ends the processing.

In this manner, during the sequence zoom shooting, the states of the switches SW1 and SW2 are checked whenever the photographing lens moves to a predetermined focal length. If the switch SW2 is turned off, the sequence zoom shooting is temporarily stopped. When an operator removes his or her hand from the release button to turn off the switch SW1 too, the sequence zoom shooting mode is cancelled if at least one shot is already exposed in the sequence zoom shooting mode.

Even when the switch SW2 is turned off after the photographing lens moves to a predetermined focal length, if the switch SW1 is turned on, i.e., if the release button is depressed to the first stroke, the sequence zoom shooting is temporarily stopped, but the remaining sequence zoom shooting is continued when the release button is depressed to the second stroke.

Even when both the switches SW1 and SW2 are turned off, if no shot is photographed at this time, the sequence zoom shooting is temporarily stopped, but the sequence zoom shooting mode is not cancelled.

Figure 9:
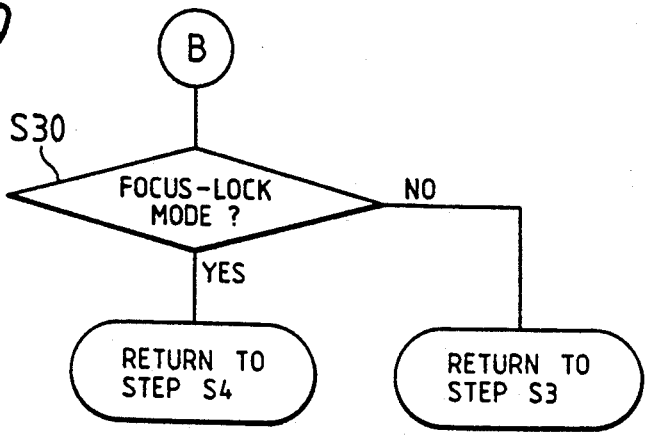
FIG. 9 is a flow chart for explaining a modification of the procedure shown in FIG. 7.

FIG. 9 shows a modification of the procedure in step S23 shown in FIG. 7. In this modification, determination step S30 is added after NO is determined in step S15. In step S30, the CPU checks whether the range information and the brightness information are to be read out again as in step S3 of FIG. 6 each time a shot is to be photographed or subsequent photography is to be performed by the range and brightness information read out in the first photography operation without reading them out again. In this case, the CPU operates in accordance with a state of a focus lock switch (not shown) provided to the camera and operated to fix a current focusing state of the lens. That is, if a focus lock mode is set in advance, the flow advances from step S30 to S4 without reading out the range and brightness information again.

In this embodiment, the release signal is output while the switch SW2 is kept on, and exposure is executed by the sequence zoom shooting in accordance with the release signal. When the switch SW2 is turned off and the release signal disappears, the sequence zoom shooting is interrupted. The release signal, however, may be output by a first ON operation of the switch SW2 and disappear by a second ON operation performed after the switch SW2 is turned off once. Alternatively, an additional interruption switch may be operated to cancel the sequence zoom shooting.

Figure 10:
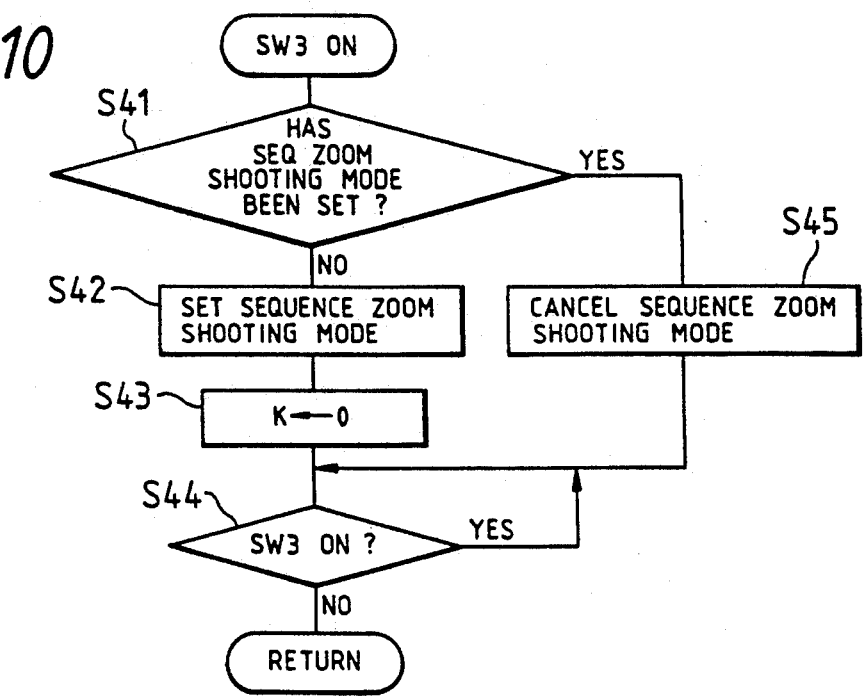
FIG. 10 is a flow chart for explaining a procedure for setting and cancelling the sequence zoom shooting.

FIG. 10 shows a procedure for setting and cancelling the sequence zoom shooting mode executed by the switch SW3. In step S41, the CPU checks whether the sequence zoom shooting mode has been set. If NO in step S41, the CPU sets the sequence zoom shooting mode in step S42 and resets the count value K of the sequence zoom shooting counter in step S43. In step S44, the CPU checks whether the switch SW3 is turned on. If YES in step S44, the flow stays at step S44. If NO in step S44, the flow returns to another procedure. Meanwhile, if YES in step S41, the CPU cancels the sequence zoom shooting mode in step S45.

Figure 11:
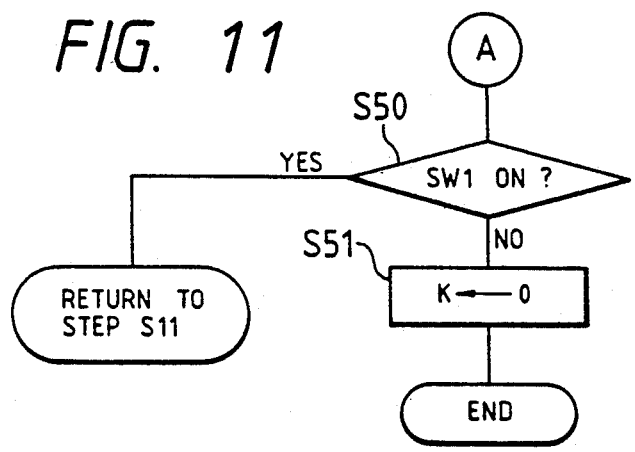
FIGS. 11, 12 and 13 are flow charts for explaining other modifications of the procedure shown in FIG. 7, respectively.

FIG. 11 shows a modification of the procedure shown in FIG. 8. If NO in step S11 of FIG. 6, i.e., if the CPU determines that the switch SW2 is turned off after zooming is performed, the flow advances to step S50 in FIG. 11, and the CPU checks whether the switch SW1 is turned on. If YES in step S50, the flow returns to step S11 of FIG. 6, and the CPU repeatedly performs this loop processing until the switch SW2 is turned on. In step S51, the CPU sets the count value K to be 0 and ends the processing.

In this modification, if the switch SW2 is turned off, the sequence zoom shooting is interrupted. If the switch SW1 is turned off too, only the sequence zoom shooting counter is reset to be 0 without cancelling the sequence zoom shooting mode, and the processing is ended. Therefore, if only the switch SW2 is turned off and the switch SW1 is turned on, i.e., if the release button is returned to the first stroke, the count value is held although the sequence zoom shooting is temporarily stopped. When the release button is fully depressed to turn on the switch SW2, the sequence zoom shooting is resumed from the interrupted shot.

If both the switches SW1 and SW2 are turned off, the sequence zoom shooting is interrupted and the count value is reset to be 0. However, the sequence zoom shooting mode is not cancelled.

Figure 12:
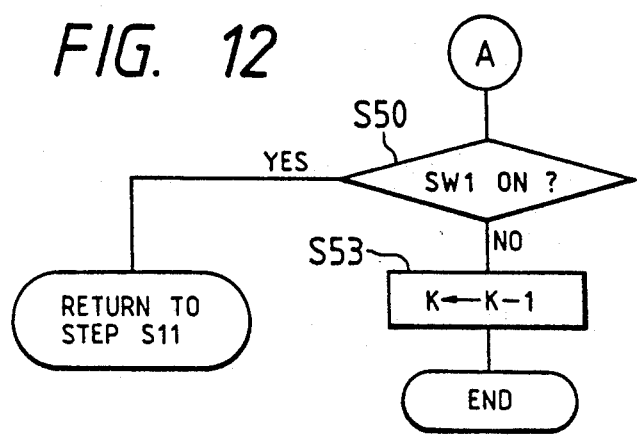

FIG. 12 is a flow chart for explaining a modification of part of the procedure shown in FIG. 11.

That is, during photography executed in the sequence zoom shooting mode, if the switch SW2 is turned off and then the switch SW1 is turned off, the flow advances from step S50 to S53, the count value K is decremented by one, and the processing is ended.

Figure 6:
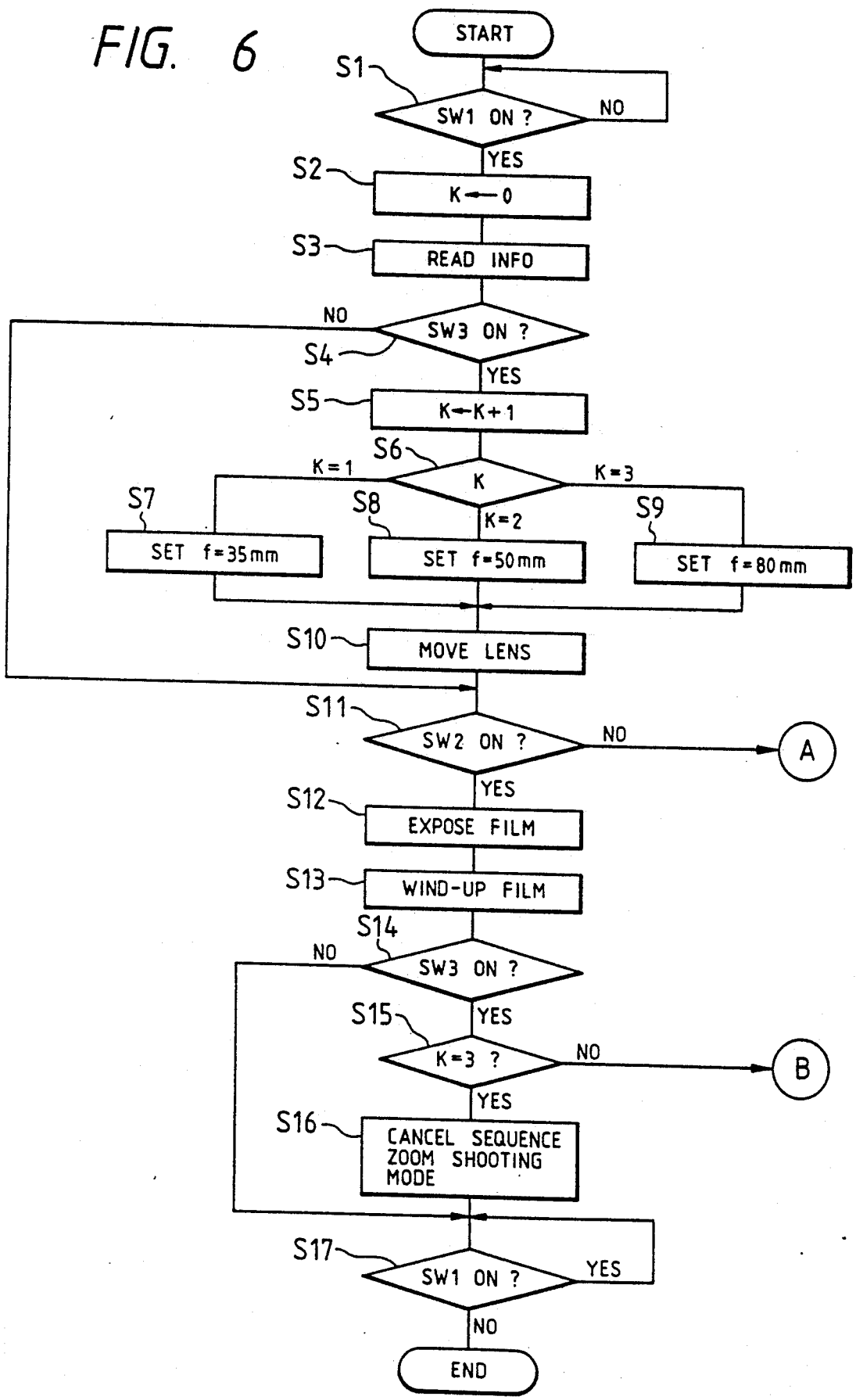
FIGS. 6, 7 and 8 are flow charts for explaining procedures of the sequence zoom shooting, respectively.

According to the procedure shown in FIG. 6, since the count value is incremented by one before exposure of the film, the number of photographed shots obtained when the sequence zoom shooting is interrupted is substantially held in the counter by decrementing the count value by one. Therefore, if the switch SW1 is turned off when exposure of only one shot is finished by a focal length of 35 mm in the sequence zoom shooting (at this time, count K=1), the flow advances from step S15 to S5 via steps S3 and S4, and K=2 is obtained in step S5. Since the count K is returned to 1 in step S53, however, by turning on the switch SW1 again to execute the procedure in FIG. 6, a focal length of 50 mm is selected to perform sequence zoom shooting photography of a second shot. In this manner, a shot interval in the sequence zoom shooting can be arbitrarily prolonged by an operator to improve operability.

In each of the above procedures, when a switch corresponding to depression of the release button is turned off before exposure of a predetermined number of shots is finished, the sequence zoom shooting is interrupted.

Several procedures in which the sequence zoom shooting is continuously executed until a predetermined number of shots are finished when the release switch is turned off will be described below.

Figure 13:
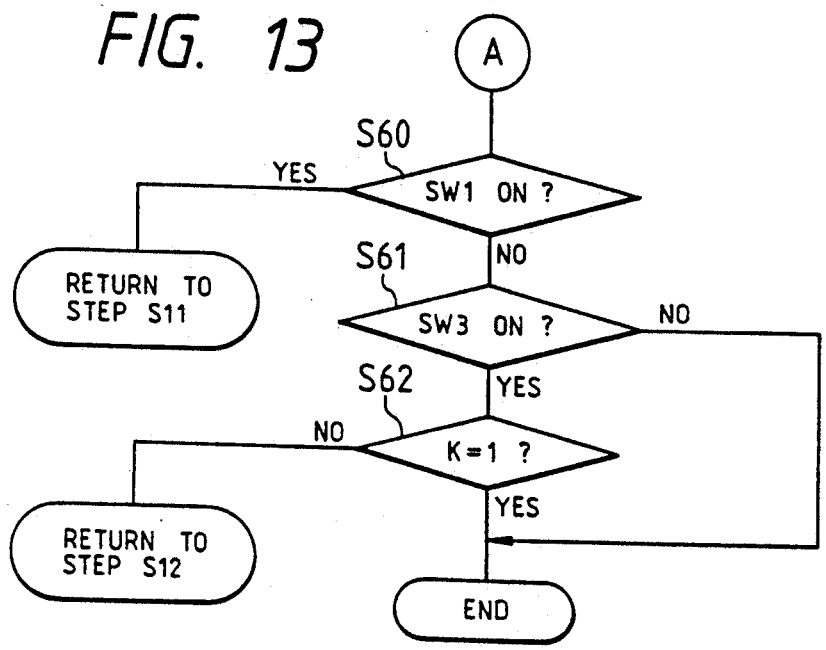

FIG. 13 shows one of such procedures. If NO in step S11 of FIG. 6, the flow advances to step S60, and the CPU checks whether the switch SW1 is turned on. In step S61, the CPU checks whether the sequence zoom shooting mode has been set. If NO in stpe S61, the CPU ends the procedure. In step S62, the CPU checks whether the count value K is 1. In this case, K = 1 means that no shot has been photographed yet. If YES in step S62, the flow returns to another processing. If NO in step S62, the flow advances to step S12 in FIG. 6, and the photographing processing is executed.

According to this procedure as described above, even when both the switches SW1 and SW2 are turned off, the sequence zoom shooting is continuously performed if at least one shot has been exposed in the sequence zoom shooting. Similarly to the above-mentioned procedures, if the switch SW2 is turned off and the switch SW1 is turned on in the sequence zoom shooting, the sequence zoom shooting is temporarily stopped. Thereafter, if the switch SW2 is turned on again or the switch SW1 is turned off, the sequence zoom shooting is resumed. Therefore, once the release button is fully depressed, a predetermined number of shots are photographed even if an operator removes his or her finger, thereby improving operability.

In the procedure as shown in FIG. 6, step S16 is provided to cancel the sequence zoom shooting mode after a predetermined number of shots are exposed. If step S16 is omitted so that the flow directly advances to step S17 after photographing of three shots is finished and YES is determined in step S15, the sequence zoom shooting mode is not cancelled after the sequence zoom shooting is finished. Therefore, by subsequently performing the release operation, the sequence zoom shooting is resumed. That is, since the sequence zoom shooting mode set button need not be operated each time the sequence zoom shooting is to be performed, operability can be further improved.

Modifications in which the present invention is applied to a camera capable of performing so-called pseudo zooming will be described below.

In pseudo zooming, as disclosed in, e.g., U.S. Pat. No. 4,652,104, in order to print a picture from a developed film, not the entire photographed shot is printed, but a specific area is designated and printed in an enlarged scale, thereby obtaining a picture similar to that obtained by zooming. For this purpose, an indication called a trimming indication must be recorded in a blank portion of a film during photography. Upon printing, this indication is detected at the enlarger side, and a film is printed in accordance with the trimming indication to form a pseudo-zoomed picture. Such photography in which information (trimming indication) for designating a printing mode is recorded on a film upon exposure of the film is called trimming photography.

Figure 14:
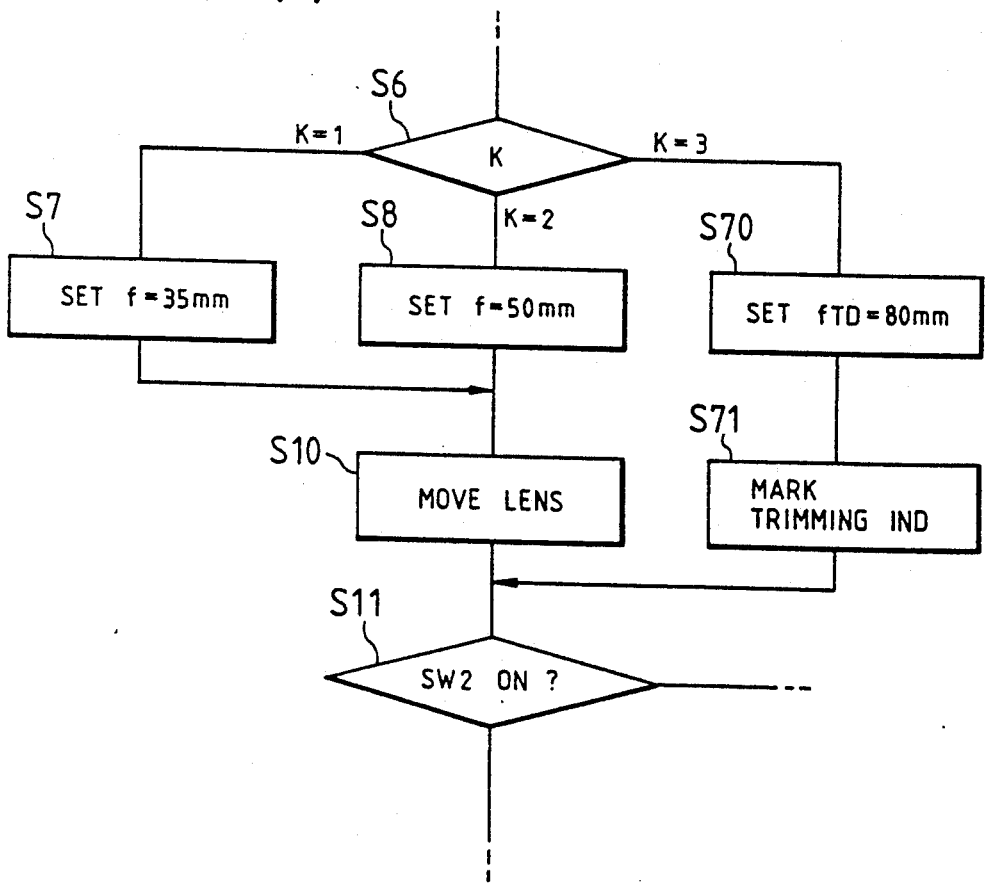
FIGS. 14 and 15 are flow charts for explaining modifications of a procedure for replacing part of FIG. 6.

FIG. 14 shows a modification in which an 80-mm pseudo-zooming function is additionally provided to a t/w switchable camera of 35 mm and 50 mm. In sequence zoom shooting, first and second shots are photographed by setting focal lengths of a photographing lens to be 35 mm and 50 mm, respectively. A third shot is photographed by a focal length of 50 mm, and a trimming indication designating that a shot obtained by a focal length of 80 mm is to be printed is recorded in a blank portion of the film.

That is, if K = 3 is determined in step S6 of FIG. 6, a focal length of 80 mm is set as trimming data fTD in step S70, and a trimming indication is recorded in a blank portion of a film prior to exposure of the film in step S71. After step S11, photography is performed in accordance with the procedure shown in FIG. 6.

Figure 15:
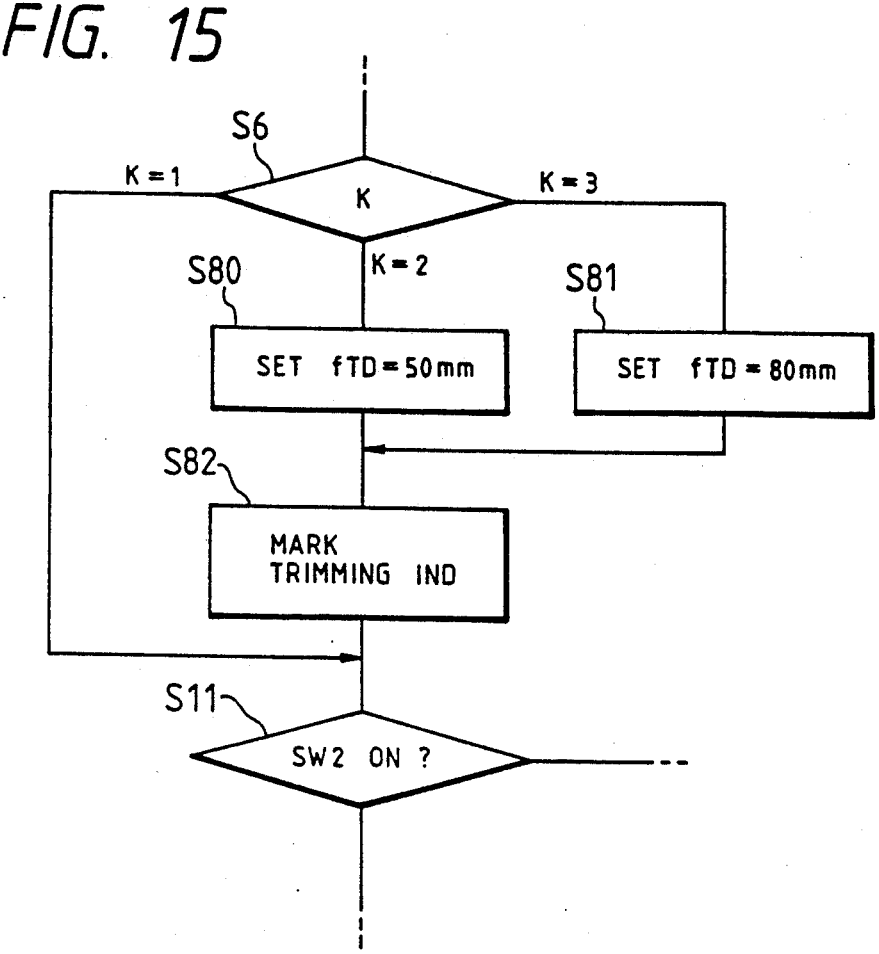

FIG. 15 shows a modification in which the present invention is applied to a camera capable of performing pseudo zooming. In this modification, a camera having a single focal length of, e.g., 35 mm is used to perform pseudo zooming of focal lengths of 50 and 80 mm.

That is, if K = 1 in step S6 of FIG. 6, photography is performed by the processing from step S11. If K = 2 or 3 is determined in step S6, trimming data fTD of focal length or 50 mm or 80 mm is set in step S80 or S81, a trimming indication is recorded in a blank portion of a film in step S82, and then the flow advances to step S11 and subsequent steps.

In each of the above modifications, the number of shots and focal lengths in sequence zoom shooting are preset in the camera. The present invention, however, is not limited to the above modifications but can be applied to a camera, in which the number of shots and focal lengths can be changed by an external operating member.

Another embodiment in which a zooming direction can be arbitrarily selected upon sequence zoom shooting will be described. An arrangement of a camera used in this embodiment is similar to that shown in FIG. 5 except for the command unit 50.

Figure 16:
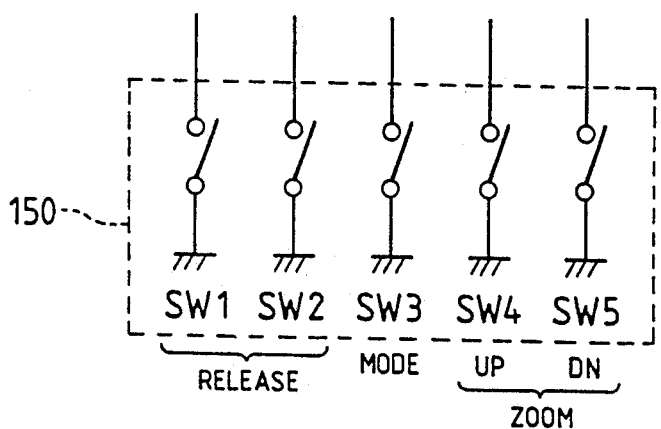
FIG. 16 is a circuit diagram showing an arrangement of a command unit of a camera according to another embodiment of the present invention.

FIG. 16 shows a command unit 150 of the camera used in this embodiment.

Switches SW1 and SW2 interlocked with an operation of a release button of the camera and a switch SW3 for setting a sequence zoom shooting mode are similar to those in the first embodiment. The command unit 150 also includes a zoom-UP switch SW4 and a zoom-DN (down) switch SW5. The switches SW4 and SW5 are turned on in association with an operation of a zoom operation knob (not shown). When the switch SW4 or SW5 is turned on, a CPU causes a zooming motor 62 to zoom-up or zoom-down drive a photographing lens to an arbitrary focal length via a driver 60.

Also in this embodiment, when a sequence zoom shooting mode is set, photography and zoom driving are alternately performed in response to an output of a release signal, thereby performing sequence zoom shooting in which photography is sequentially executed by focal lengths of 35 mm, 50 mm and 80 mm.

Control procedures performed by the CPU will be described below with reference to flow charts.

Figure 17:
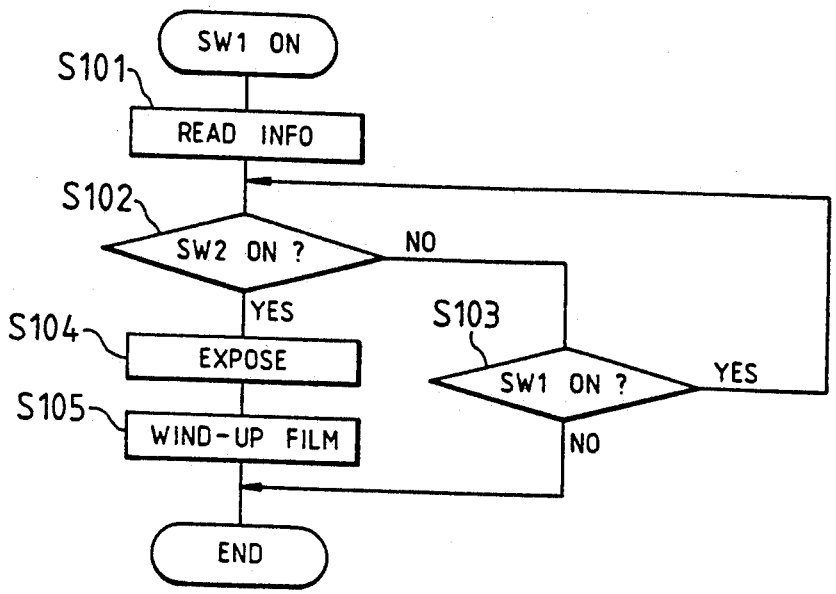
FIGS. 17, 18 and 19 are flow charts for explaining operation procedures, respectively.

FIG. 17 shows a control procedure to be executed by the CPU in a normal photography mode.

When the switch SW1 is turned on by a release button, the CPU reads out brightness information from a metering circuit 20 and range information from a range finder 80 in step S101. In step S102, the CPU checks whether the switch SW2 is turned on. If NO in step S102, the CPU checks in step S103 whether the switch SW1 is turned on. If YES in the step S103, the flow returns to step S102. If NO in step S103, the processing is ended. If YES in step S102, the flow advances to step S104, and the CPU performs focusing on the basis of the readout range information and exposes a film via an EV control circuit 70. Thereafter, in step S105, the CPU drives a motor 63 to wind up one shot of the film and ends the processing.

Figure 18:
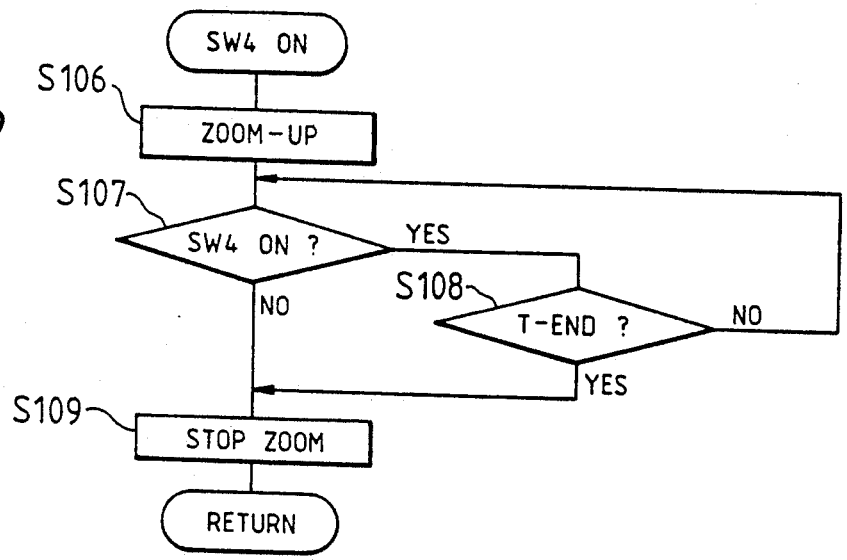

FIG. 18 shows a control procedure to be executed when the zoom-UP switch SW4 is turned on.

When the zoom-UP switch SW4 is turned on by an operation of the zoom operation knob, the photographing lens starts zoom-up driving, i.e., zoom driving from a wide-range-end (W-end) (corresponding to a focal length of 35 mm) to a telephoto-end (T-end) (corresponding to a focal length of 80 mm) in step S106. In step S107, the CPU checks whether the zoom operation knob is continuously operated. If YES in step S107, the CPU checks in step S108 whether the photographing lens is located at the T-end. If NO in step S108, the flow returns to step S107. If YES in step S108, driving of the photographing lens is stopped in step S109. If NO is determined in step S107, i.e., if the operation of the zoom operation knob is interrupted, driving of the photographing lens is stopped in step S109.

In this manner, when the normal photography mode is set, the zoom operation knob arbitrarily drives the photographing lens between the T- and W-ends. If the operation of the zoom operation knob is cancelled, zoom driving of the photographing lens is immediately stopped. Therefore, in order to zoom-drive the photographing lens to the T- or W-end, the operation of the zoom operation knob must be continued without cancelling it.

Figure 19:
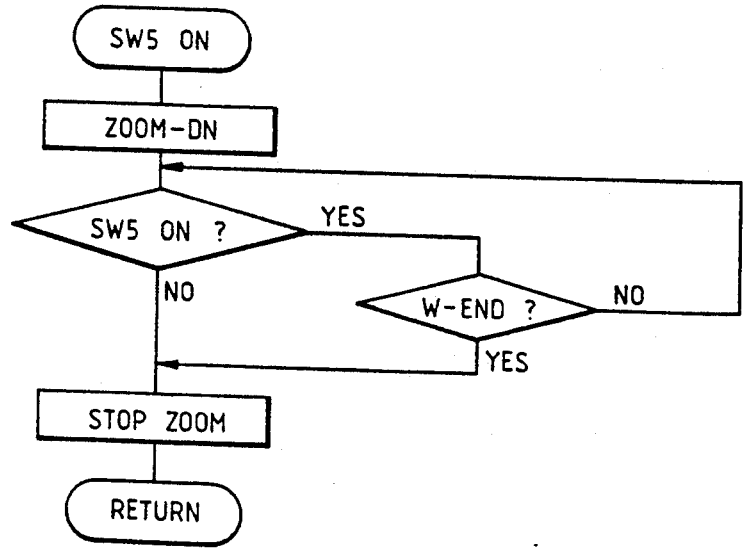

FIG. 19 shows a control procedure to be executed when the zoom-DN switch SW5 is turned on by an operation of the zoom operation knob. The control procedure is similar to that shown in FIG. 18 and a detailed description thereof will be omitted.

Several control procedures to be executed by the CPU when a sequence zoom shooting mode is set will be described below.

Figure 20:
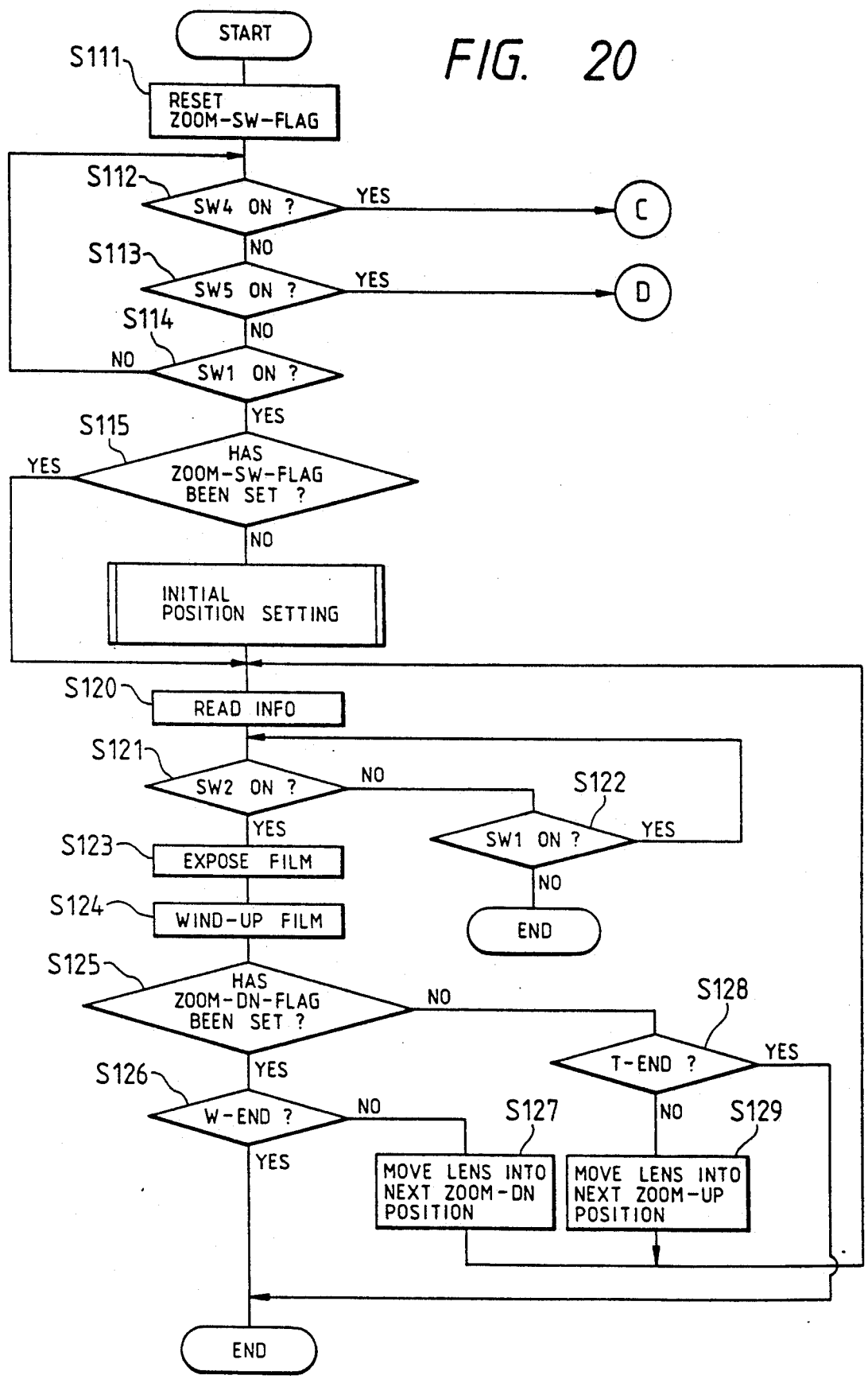
FIGS. 20, 21 and 22 are flow charts for explaining sequence zoom shooting procedures, respectively.

Referring to FIG. 20, when the switch SW3 is operated by the mode set button to set a sequence zoom shooting mode, a zoom-SW (switch)-flag is reset in step S111. The zoom-SW-flag is for checking whether the zoom operation knob is operated and is set upon operation of the zoom operation knob.

In step S112, the CPU checks whether the zoom-UP switch SW4 is turned on. In step S113, the CPU checks whether the zoom-DN switch SW5 is turned on. In step S114, the CPU checks whether the switch SW1 is turned on, i.e., whether the release button is half depressed.

In step S115, the CPU checks whether the zoom-SW-flag is set. If the zoom operation knob is not operated and the zoom-SW-flag is not set, initial position setting of the photographing lens is performed.

Figure 21:
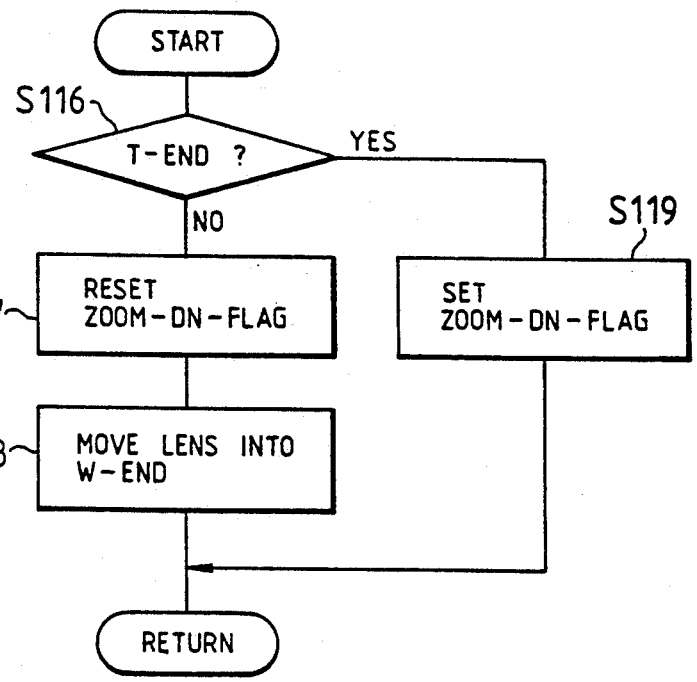

In initial position setting, as shown in FIG. 21, the CPU checks in step S116 whether the photographing lens is located at the T-end. If the photographing lens is determined not to be located at the T-end in step S116, a zoom-DN (down)-flag is reset in step S117, and the photographing lens is moved into the W-end in step S118. The zoom-DN-flag is for checking whether the photographing lens is moved in a direction from a focal length of 35 mm to 80 mm or vice versa when the sequence zoom shooting mode is set. If the zoom-DN-flag is reset, the photographing lens is moved to the direction from a focal length of 35 to 80 mm.

If the photographing lens is determined to be located at the T-end in step S116, the zoom-DN-flag is set in step S119. In this manner, the CPU determines that the photographing lens is moved in the direction from a focal length of 80 to 35 mm.

When initial position setting is finished, the CPU reads out range information from the range finder 80 and brightness information from the metering circuit 20 in step S120. In steps S121 and S122, the CPU checks whether the switches SW2 and SW1 are turned on, respectively.

In step S123, the CPU performs focusing and exposes a film on the basis of the readout range information. Thereafter, the film is wound up by one shot in step S124.

In step S125, the CPU checks whether the zoom-DN-flag is set. If the zoom-DN-flag is set, the CPU determines that the photographing lens is moved in the direction from a focal length of 80 to 35 mm and checks in step S126 whether the photographing lens is at the W-end. That is, when the photographing lens is moved in the direction from a focal length of 80 to 35 mm, the photographing lens is finally located at a focal length of 35 mm, i.e., at the W-end. Therefore, if YES is determined in step S126, the processing, i.e., the sequence zoom shooting is ended.

If the lens is not located at the W-end, the photographing lens is moved into the next zoom-down position to prepare for next exposure in step S127, and then the flow returns to step S120.

Meanwhile, if the zoom-DN-flag is not set, the CPU determines that the photographing lens is moved in the direction from a focal length of 35 to 80 mm and checks in step S128 whether the photographing lens is located at the T-end. That is, when the photographing lens is moved in the direction from a focal length of 35 to 80 mm, the photographing lens is finally located at a focal length of 80 mm, i.e., at the T-end. Therefore, if YES is determined in step S28, the processing, i.e., the sequence zoom shooting is ended.

If the lens is not located at the T-end, the photographing lens is moved into the next zoom-up position to prepare for next exposure, and then the flow returns to step S120.

In this manner, when the zoom operation knob is not operated after the sequence zoom shooting mode is set, the T-end is set as an initial lens position upon start of the sequence zoom shooting if the photographing lens is located at the T-end. On the other hand, if the photographing lens is not located at the T-end, the W-end is set as an initial lens position.

If a focal length at the initial lens position is 80 mm, the photographing lens is moved in the direction from 80 to 35 mm to perform the sequence zoom shooting. If the focal length at the initial lens position is 35 mm, the photographing lens is moved in the direction from 35 to 80 mm to perform the sequence zoom shooting.

Processing to be executed when the zoom operation knob is operated after the sequence zoom shooting mode is set will be described below.

Figure 22:
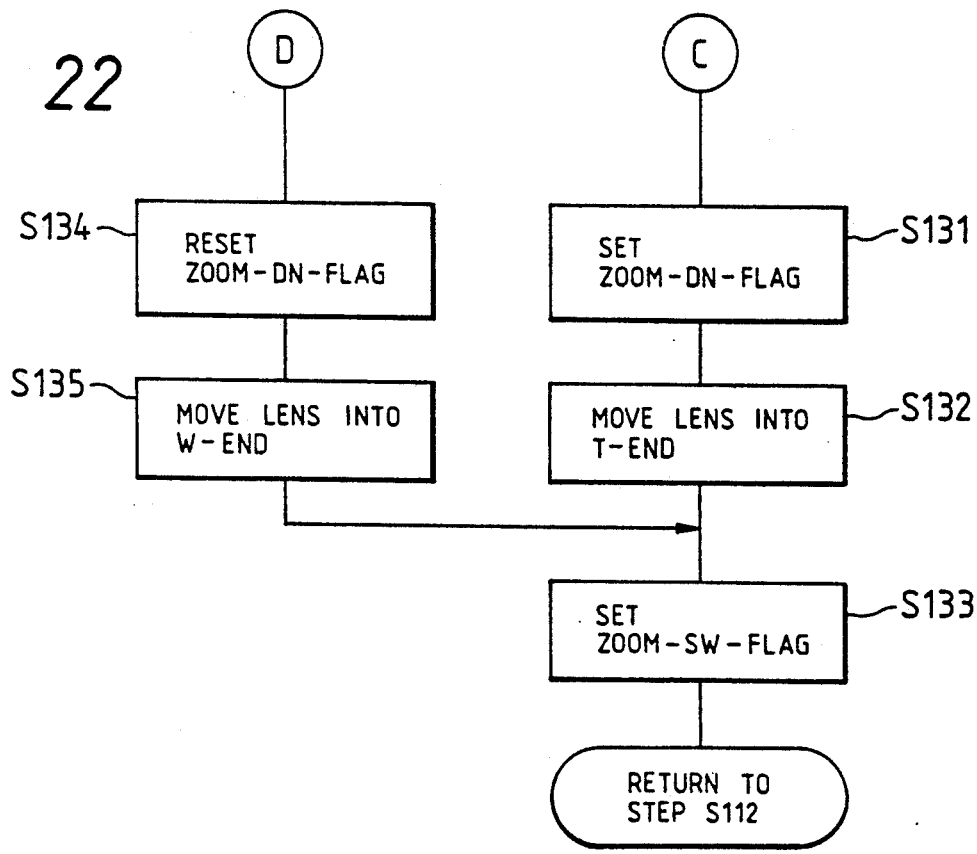

If the CPU determines in step S112 that the zoom-UP switch SW4 is turned on, the zoom-DN-flag is set in step S131 shown in FIG. 22. In step S132, the photographing lens is moved into the T-end. That is, when the zoom-UP switch SW4 is turned on upon operation of the zoom operation knob, a focal length at the start of sequence zoom shooting is set to be 80 mm. Thereafter, in step S133, the zoom-SW-flag is set to indicate that the zoom operation knob is operated, and the flow returns to step S112.

If the zoom-DN switch SW5 is turned on in step S113, the zoom-DN-flag is reset in step S134. In step S135, the photographing lens is moved into the W-end.

That is, when the zoom-DN switch SW5 is turned on upon operation of the zoom operation knob, a focal length at the start of sequence zoom shooting is set to be 35 mm. Thereafter, in step S133, the zoom-SW-flag is set to indicate that the zoom operation knob is operated, and the flow returns to step S112.

As described above, the zoom operation knob is used to only move the photographing lens between the T-and W-ends when the normal photographing mode is set and is used to set a new focal length at the start of zooming when the sequence zoom shooting mode is set.

Therefore, if the zoom operation knob is not operated, a focal length at the start of sequence zoom shooting is determined in accordance with the position of the photographing lens. If this initial focal length is not desirable to an operator, the operator can reset the focal length by operating the zoom operation knob.

Alternatively, in initial position setting of the lens performed in FIGS. 20 and 21, an arrangement may be made such that if the photographing lens is not located at the W-end, the zoom-DN-flag is set to move the photographing lens into the T-end, and if the photographing lens is located at the W-end, the zoom-DN-flag is reset. That is, a modification can be arbitrarily made such that if the photographing lens is located at the W-end, 35 mm is set as a focal length at the start of sequence zoom shooting, and if the photographing lens is not located at the W-end, 80 mm is set as a focal length.

Figure 23:
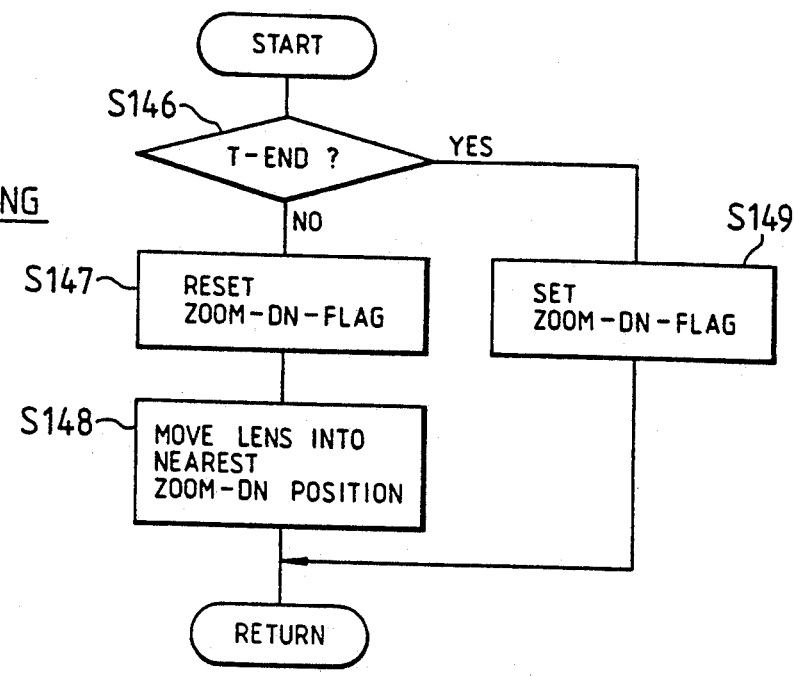
FIGS. 23 and 24 are flow charts for explaining modifications of the procedures shown in FIG. 21 and 22, respectively.
Figure 24:
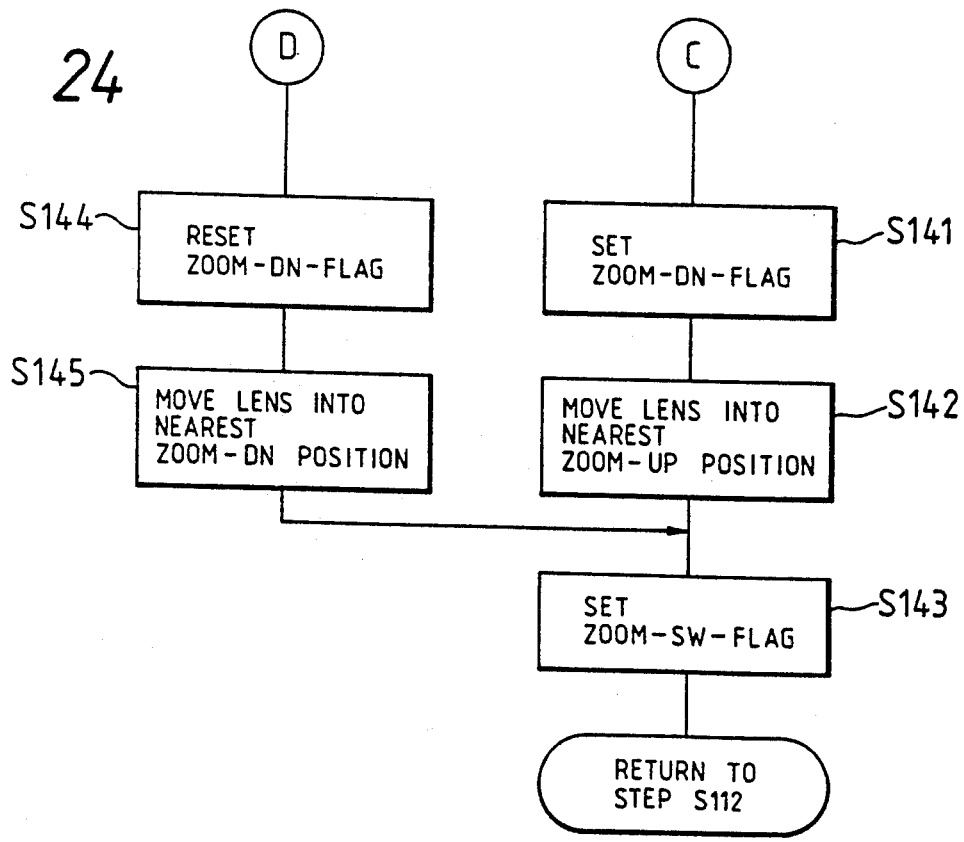

In modifications shown in FIGS. 23 and 24, one of predetermined positions (e.g., focal lengths of 35 mm, 50 mm, 60 mm and 80 mm) nearest to a current focal position of the photographing lens is set as a focal length at the start of sequence zoom shooting.

If NO is determined in step S115 of FIG. 20, initial position setting is executed in accordance with FIG. 23. That is, the CPU checks in step S146 whether the photographing lens is located at the T-end. If NO in step S146, the zoom-DN-flag is reset in step S147. In step S148, the photographing lens is moved into a nearest zoom-down position of the predetermined focal lengths, and this focal length is set as a focal length at the start of sequence zoom shooting.

If the zoom-UP switch SW4 is turned on in step S112, the zoom-DN-flag is set in step S141, and the photographing lens is moved into a nearest zoom-down position of the predetermined focal lengths in step S142.

If the zoom-DN switch SW5 is turned on in step S113, the zoom-DN-flag is reset in step S144, and the photographing lens is moved in step S145 into a nearest zoom-down position in the W-end direction of the predetermined focal lengths.

Figure 25:
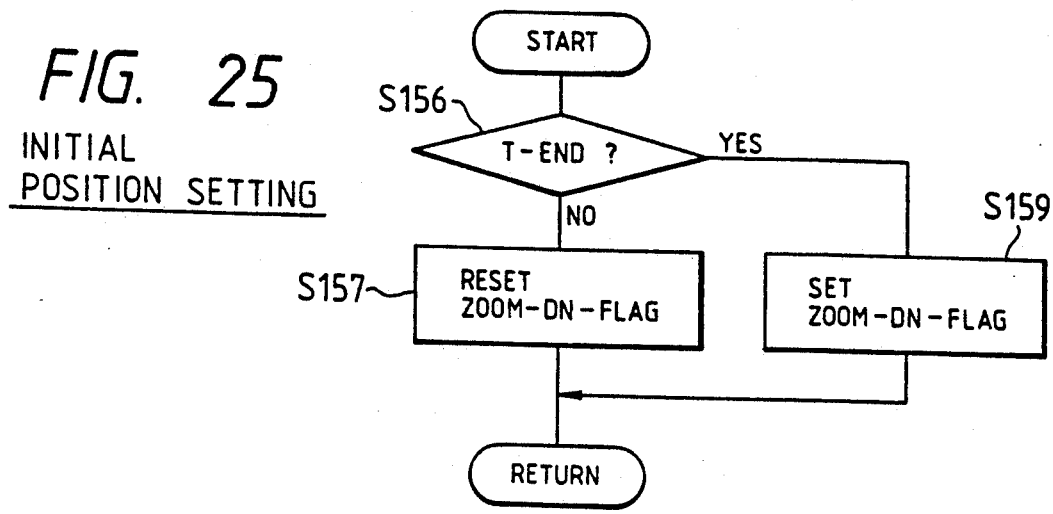
FIGS. 25 and 26 are flow charts for explaining other modifications of the procedures shown in FIGS. 21 and 22, respectively.
Figure 26:
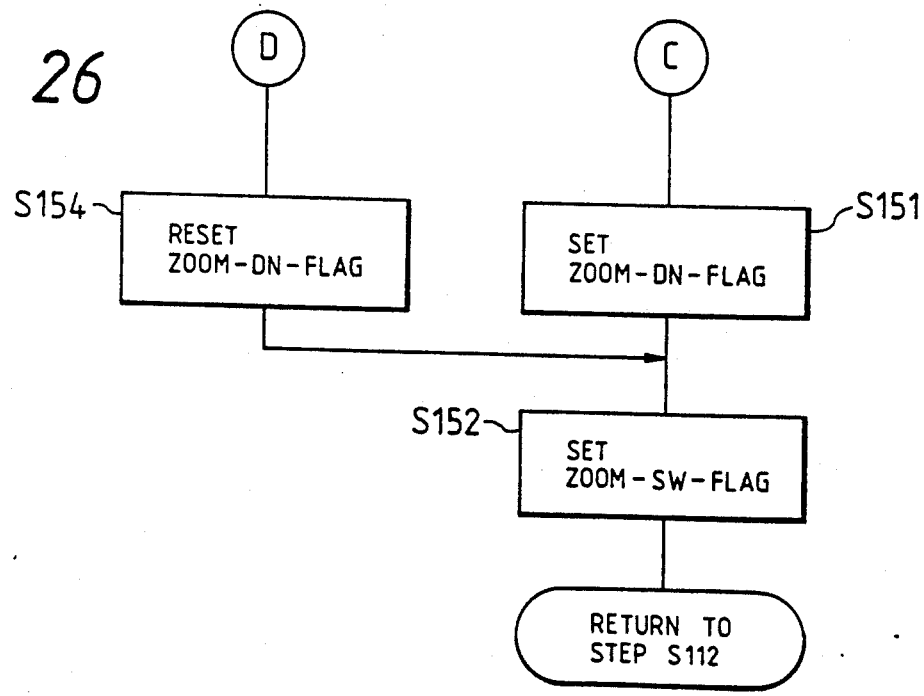

In modifications shown in FIGS. 25 and 26, a focal length of the photographing lens detected by the position detector 40 is directly used as a focal length at the start of sequence zoom shooting.

In the first step, S156, of initial position setting, the CPU checks whether the photographing lens is located at the T-end. If NO in step S156, the zoom-DN-flag is reset in step S157, and the flow advances to step S120 in FIG. 20. If YES in step S156 the zoom-DN-flag is set in step S159, and the flow advances to step S120. That is, even when the photographing lens is not located at the T-end, only the zoom-DN-flag is reset without performing any processing for driving the photographing lens. In this manner, a focal length of the photographing lens detected by the position detector 40 is directly used as a focal length at the start of seqence zoom shooting.

If the zoom-UP switch SW4 is turned on in step S112, the zoom-DN-flag is set in step S151 of FIG. 26. If the zoom-DN switch SW5 is turned on in step S113, the zoom-DN-flag is reset in step S154. Thereafter, similarly to the above modifications, only the zoom-DN-flag is set or reset without performing any processing for driving the photographing lens. That is, in the sequence zoom shooting mode, the zoom operation knob functions to set only the zoom drive direction of the photographing lens.

Also in the second embodiment, the above-mentioned pseudo zooming can be applied as will be described below.

In this modification, a camera having a single focal length of 50 mm is used, and the following three types of trimming indications can be selected and set by a data selector (not shown).

(A) 80 mm data
(B) panorama data
(C) full picture data

In panorama trimming photography, as disclosed in U.S. Pat. No. 4,678,299, an exposure area of one shot of a film is directly output in the transverse direction and is narrowed and then output in the longitudinal direction, thereby obtaining a so-called pseudo panorama picture. The panorama data is data representing such an image output.

The full picture data is data representing that the entire exposure area of one shot of a film is to be printed and therefore is not included in trimming photography. In this modification, however, this data is recorded in part of the film surface similar to the 80 mm data or panorama data.

Figure 27:
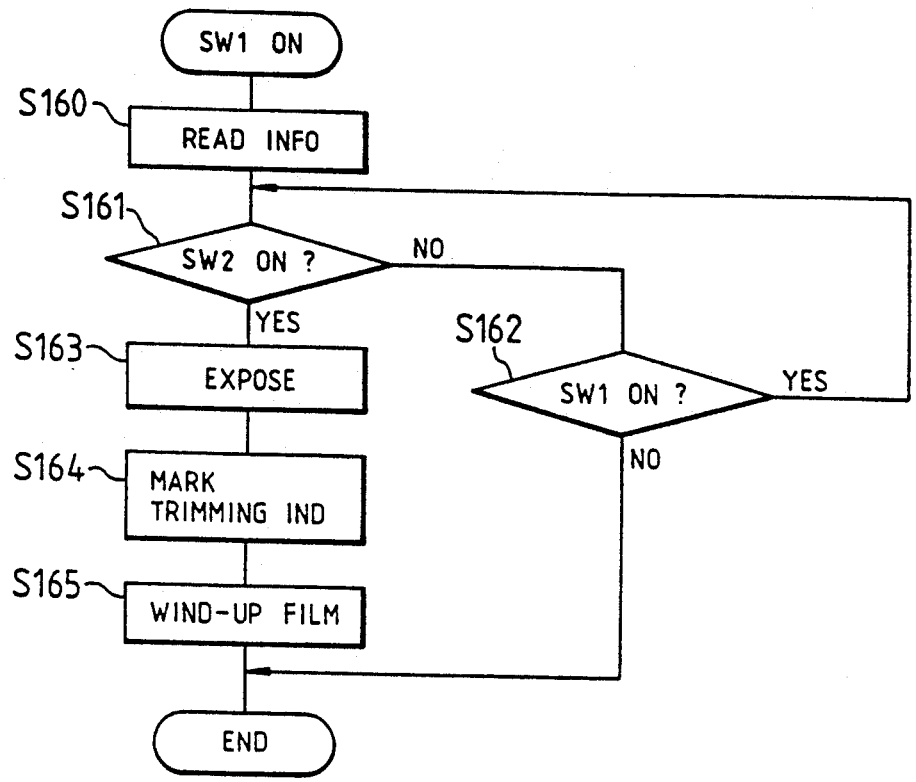
FIGS. 27, 28 and 29 are flow charts for explaining operation procedures, respectively.

Referring to FIG. 27, the mode selector (not shown) is operated to set a trimming photography mode. When an operation is started by turning on the switch SW1, the CPU reads out brightness information and range information in step S160. If the switch SW2 is turned on in step S161, the flow advances to step S163, and the CPU performs focusing and exposes a film. In step S164, a trimming indication is recorded on the film surface. Thereafter, one shot of the film is wound up, and the processing is ended.

A control procedure to be executed in the camera capable of performing trimming photography when the data selector is operated will be described below.

Figure 28:
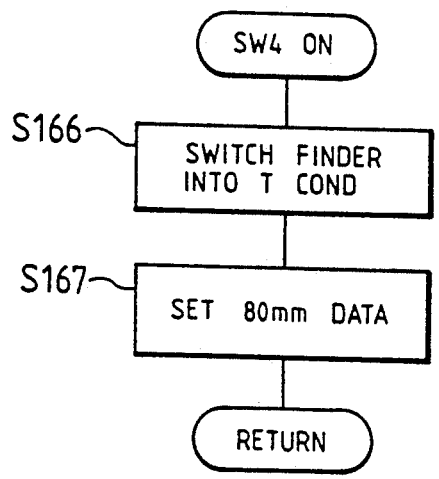

Referring to FIG. 28, when the zoom-UP switch SW4 is turned on by operating the data selector, a finder is switched into a telephoto (T) condition in step S166. Subsequently, the 80 mm data is set as trimming indication data in step S167.

Figure 29:
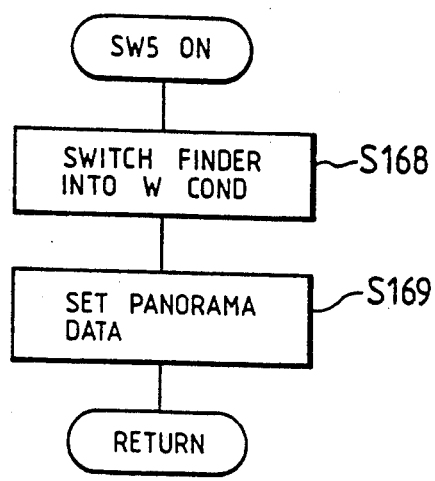

Referring to FIG. 29, when the zoom-DN switch SW5 is turned on by operating the data selector, the finder is switched into a wide (W) condition in step S168. Subsequently, in step S169, the panorama data is set as trimming indication data.

When the data selector is not operated, the full picture data is set.

A control procedure to be executed in the camera capable of performing trimming photography when sequence zoom shooting is to be performed will be described below.

Figure 30:
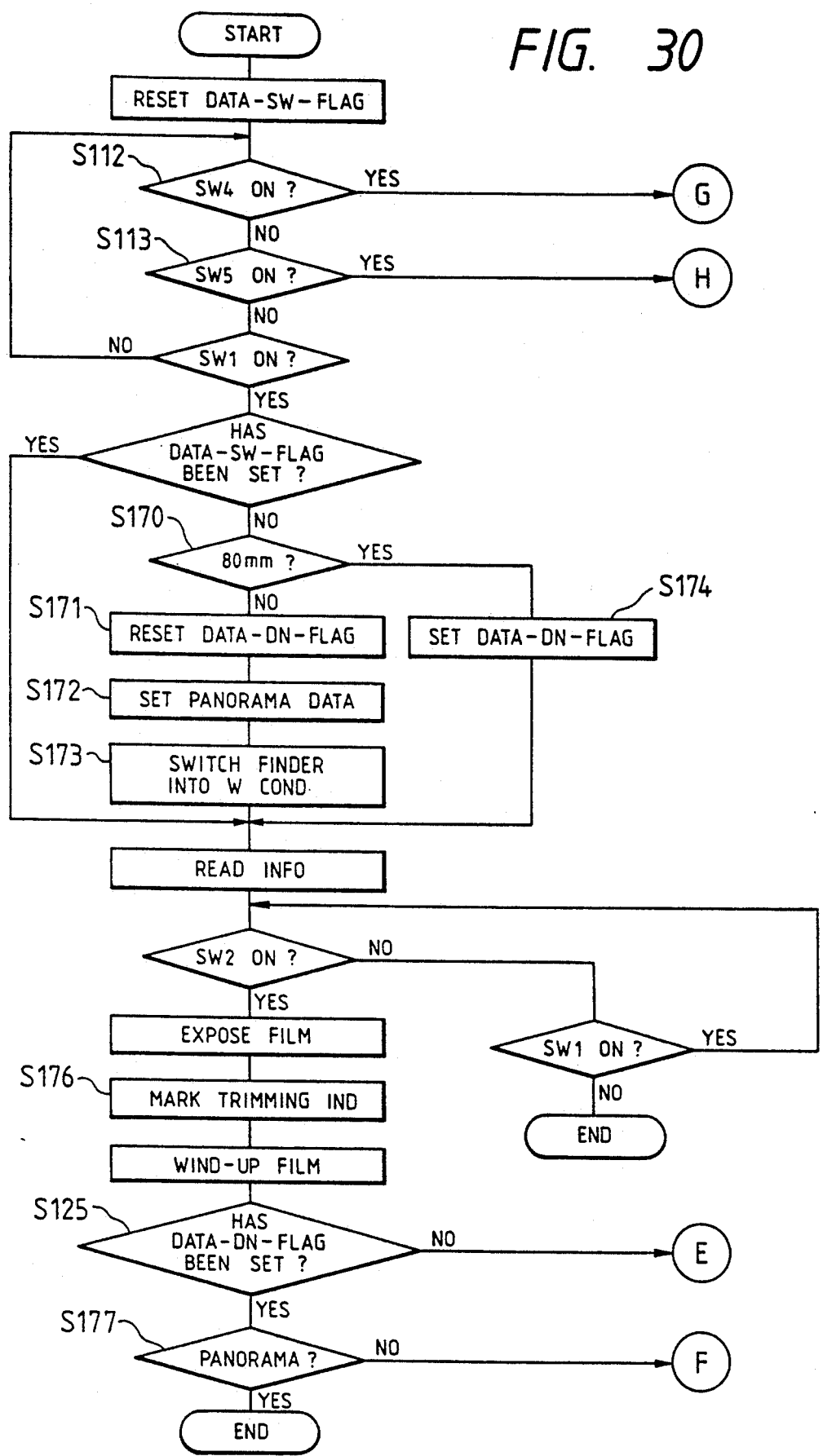
FIGS. 30, 31 and 32 are flow charts for explaining procedures of pseudo sequence zoom shooting, respectively.

A basic procedure of a flow chart shown in FIG. 30 is based on FIG. 20. Therefore, the same or substantially the same steps are denoted by the same step numbers and a detailed description thereof will be omitted.

In step S170, the CPU checks whether the 80 mm data is set as trimming indication data. The data-DN (down)-flag is reset in step S171, and the panorama data is set as trimming indication data in step S172. In step S173, the finder is switched from the T to W condition.

If YES in step S170, the data-DN-flag is set. When exposure is finished, a trimming indication is recorded on part of the film surface. If the zoom-DN-flag is set in step S125, the CPU determines that the trimming indication data is changed from the 80 mm to panorama data. Therefore, in step S177, the CPU checks whether sequence zoom shooting photography is started by the 80 mm data, the panorama data is set as the trimming indication data after a final shot is photographed. Therefore, if YES is determined in step S177, the processing, i.e., the sequence zoom shooting is ended.

Figure 31:
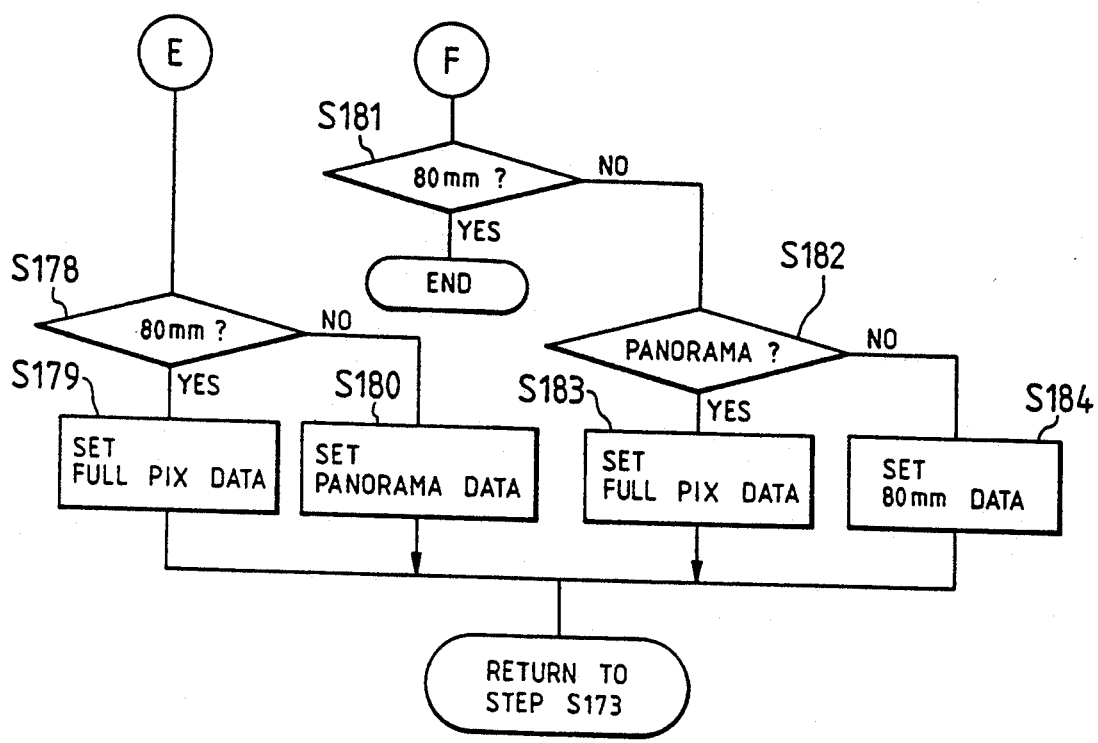

If NO is determined in step S177, the CPU checks in step S178 of FIG. 31 whether the 80 mm data is set. If YES in step S178, the full picture data is set. If NO in step S178, the panorama data is set.

If NO is determined in step S125, the CPU determines that the sequence zoom shooting is started using the panorama data. Therefore, in step S181, the CPU checks whether the 80 mm data is set. That is, when sequence zoom shooting photography is started by the panorama data, the 80 mm data is finally set as the trimming indication data. Therefore, if YES is determined in step S181, the processing, i.e., the sequence zoom shooting is ended.

If NO is determined in step S181, the CPU checks whether the panorama data is set. If YES in step S181, the full picture data is set. If NO in step S181, the 80 mm data is set. Thereafter, the flow returns to step S173.

In this manner, when the sequence zoom shooting mode is set in the camera capable of performing trimming photography and the data selector is not operated, if the 80 mm data is set, the sequence zoom shooting is started using the 80 mm data as trimming indication data at the start of the sequence zoom shooting If the 80 mm data is not set, the sequence zoom shooting is started using the panorama data.

If data at the start of sequence zoom shooting is the 80 mm data, the sequence zoom shooting is performed by changing the data from the 80 mm to panorama data. If data at the start of sequence zoom shooting is the panorama data, the sequence zoom shooting is performed by changing the data from the panorama to 80 mm data.

Figure 32:
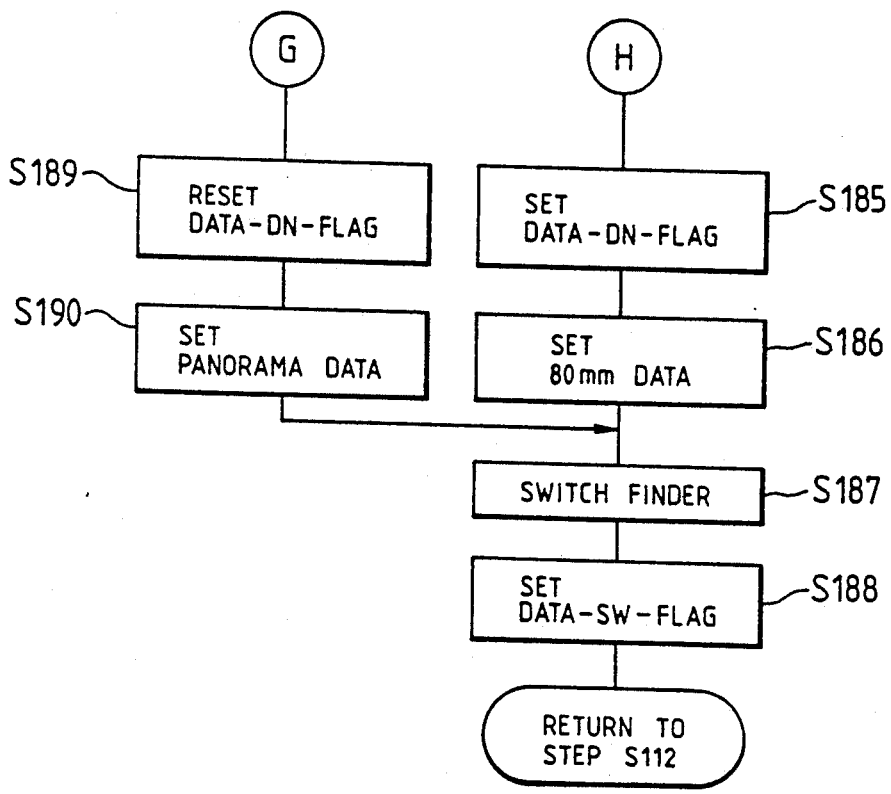

A procedure to be executed when the data selector is operated after the sequence zoom shooting mode is set will be described below. If the zoom-UP switch SW4 is turned on in step S112, the data-DN-flag is set in step S185 of FIG. 32. The 80 mm data is set in step S186, and the finder is switched in step S187. The data-SW-flag is set in step S188 so that the CPU determines that the data selector is operated, and the flow returns to step S112.

If the zoom-DN switch SW5 is turned on in step S113, the data-DN-flag is reset in step S189. The panorama data is set in step S190.

As described above, in the trimming photography mode, the data selector is used to only set data concerning the trimming indication and to switch the finder. In the sequence zoom shooting mode, however, the data selector is used to set new trimming indication data at the start of sequence zoom shooting. Therefore, similar to FIG. 20, by operating the data selector, a change order of the trimming indication data can be arbitrarily reset at the start of sequence zoom shooting and during the sequence zoom shooting.

The next modification is a camera in which a photographing lens can be moved between focal lengths of 35 and 50 mm and the 80 mm data can be set as trimming indication data.

Figure 33:
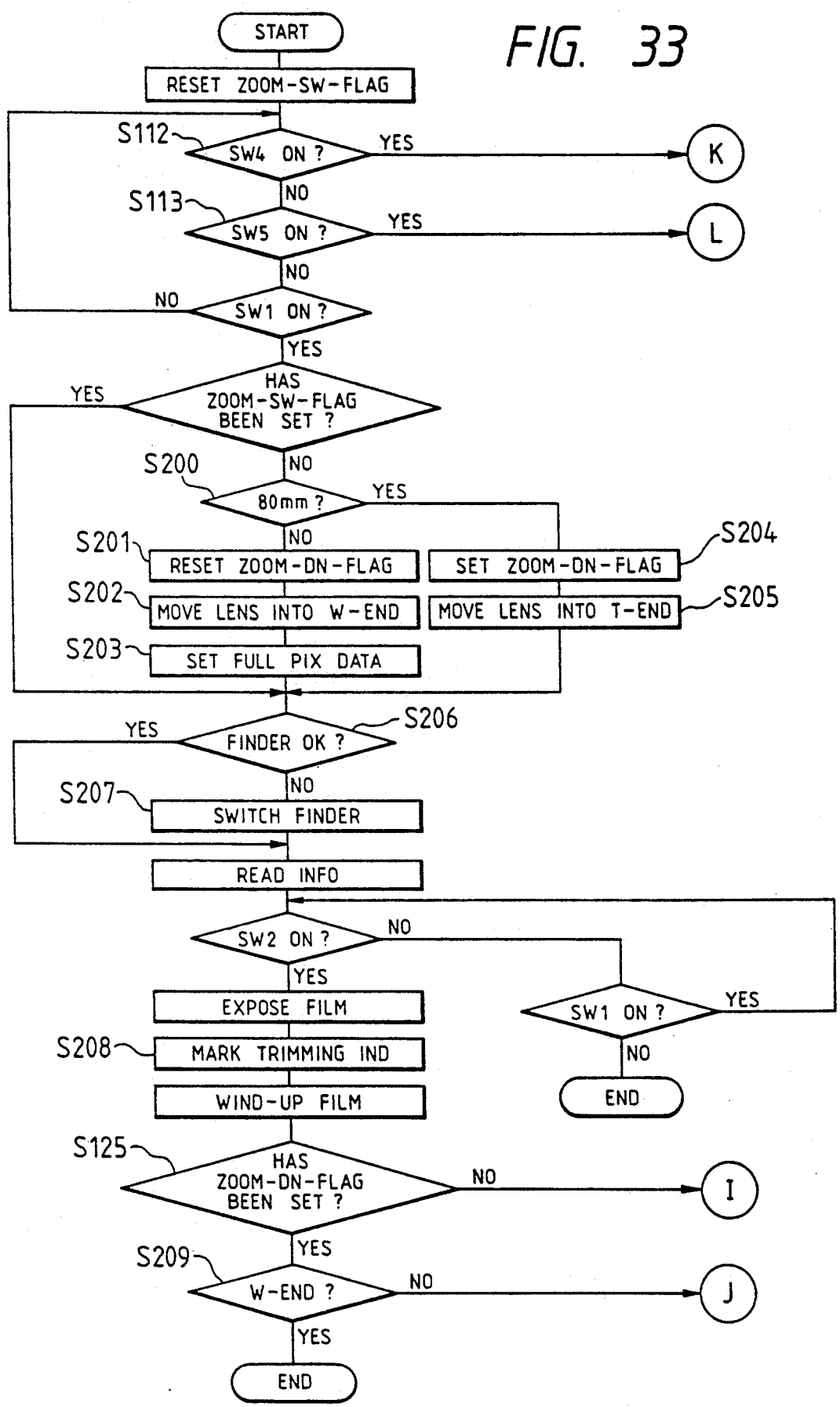
FIGS. 33, 34 and 35 are flow charts for explaining modifications of the pseudo sequence zoom shooting, respectively.

Referring to FIG. 33, if the 80 mm data is not set in step S200, the zoom-DN-flag is reset in step S201. The photographing lens is moved into the W-end in step S202, and the full picture data is set in step S203.

If the 80 mm data is set in step S200, the zoom-DN-flag is set in step S204, and the photographing lens is moved into the T-end in step S205.

In step S206, the CPU checks whether the finder is to be switched. If switching is necessary, the finder is switched in step S207. The trimming indication is marked in step S208, and a film is wound up. If the zoom-DN-flag is set in step S25, the CPU checks in step S209 whether the photographing lens is located at the W-end. If YES in step S209, the processing, i.e., the sequence zoom shooting is ended.

Figure 34:
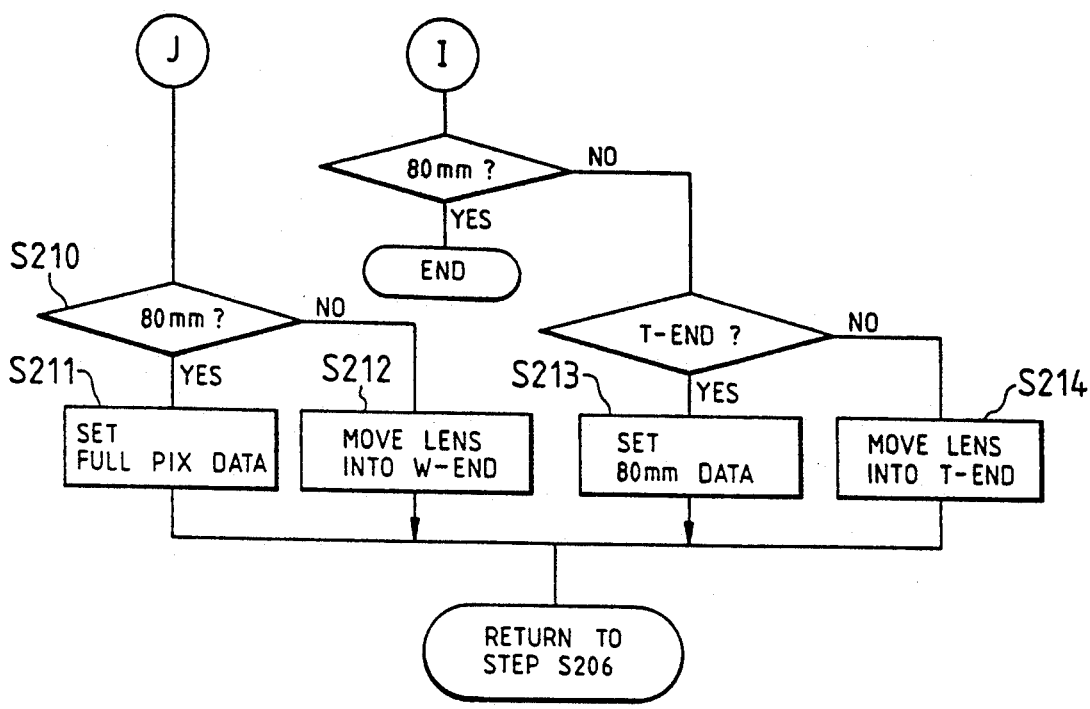

If NO in step S209, the CPU checks in step S210 of FIG. 34 whether the 80 mm data is set. If YES in step S209, the full picture data is set in step S211. If the 80 mm data is not set in step S210, the photographing lens is moved into the W-end in step S212.

If NO is determined in step S125, the 80 mm data is not set and the photographing lens is located at the T-end, the 80 mm data is set in step S213. In this case, if the photographing lens is not located at the T-end, the photographing lens is moved into the T-end in step S214.

Figure 35:
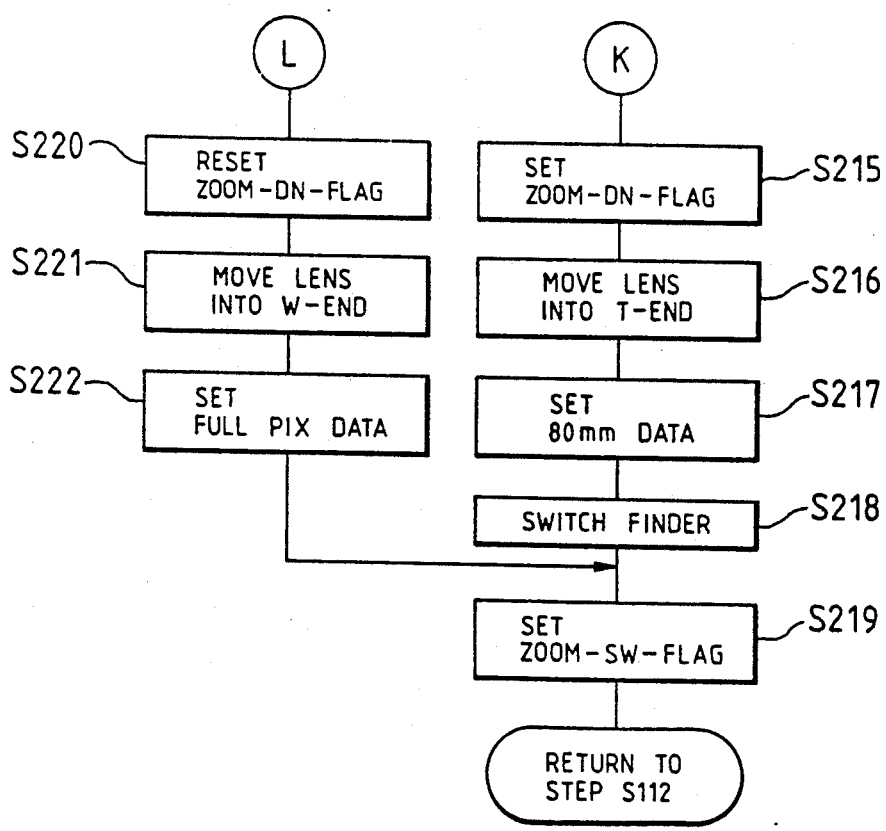

If the zoom-UP switch SW4 is turned on in step S112, the zoom-DN-flag is set in step S215 of FIG. 35. Subsequently, the photographing lens is moved into the T-end, and the 80 mm data is set to switch the finder. In step S219, the zoom-SW-flag is set so that the CPU determines that the zoom selector is operated.

If the zoom-DN switch SW5 is turned on in step S113, the zoom-DN-flag is reset in step S220, the photographing lens is moved into the W-end, the full picture data is set, and the zoom-SW-flag is set.

What is claimed is:

1. A camera comprising:
triggering means for generating a release signal;
means for providing a plurality of trimming data representing different areas in an entire photographed shot, respectively;
exposure control means for sequentially executing a predetermined number of exposures during generation of said release signal;
sequence shooting means for sequentially changing said trimming data each time said exposure control means operates to execute an exposure; and
interrupting means for interrupting the operation performed by said sequence shooting means when said release signal disappears.

2. A camera comprising:
means for providing a plurality of trimming data representing different areas in an entire photographed shot, respectively;
sequence shooting means for executing a plurality of exposures and for sequentially changing said trimming data each time an exposure is executed; and
means for registering said trimming data at every exposure.

3. A camera according to claim 2 further comprising means for determining a changing direction of said trimming data changed upon said plurality of exposures by said sequence shooting means.

4. A camera comprising:
triggering means for generating a release signal;

means for providing a plurality of trimming data representing different areas in an entire photographed shot, respectively;

exposure control means for sequentially executing a predetermined number of exposure of film during generation of said release signal;

sequence shooting means for sequentially changing said trimming data each time said exposure control means operates to execute an exposure; and means for maintaining said release signal until exposures of said predetermined number are completed.

5. A camera comprising producing means for producing a plurality of trimming data representing different areas in an entire photographed shot, respectively; and sequence shooting means for executing a plurality of exposures and for controlling said producing means so that said producing means sequentially changes said trimming data each time an exposure is executed.

* * * * *